(12) United States Patent
Doerksen et al.

(10) Patent No.: US 12,194,860 B2
(45) Date of Patent: Jan. 14, 2025

(54) DISMOUNT CONTROLS FOR ONE-WHEELED VEHICLE

(71) Applicant: Future Motion, Inc., Santa Cruz, CA (US)

(72) Inventors: Kyle Jonathan Doerksen, Santa Cruz, CA (US); Daniel J. Wood, Camas, WA (US)

(73) Assignee: FUTURE MOTION, INC., Santa Cruz, CA (US)

( * ) Notice: Subject to any disclaimer, the term of this patent is extended or adjusted under 35 U.S.C. 154(b) by 128 days.

(21) Appl. No.: 18/172,221

(22) Filed: Feb. 21, 2023

(65) Prior Publication Data

US 2023/0202309 A1  Jun. 29, 2023

Related U.S. Application Data

(63) Continuation of application No. 17/474,615, filed on Sep. 14, 2021, now Pat. No. 11,584,236, which is a continuation of application No. 16/555,224, filed on Aug. 29, 2019, now Pat. No. 11,117,474, which is a continuation of application No. 16/213,949, filed on Dec. 7, 2018, now Pat. No. 10,399,457.

(60) Provisional application No. 62/596,026, filed on Dec. 7, 2017.

(51) Int. Cl.
*B60L 15/20* (2006.01)
*B60L 50/50* (2019.01)
*B62K 11/00* (2006.01)

(52) U.S. Cl.
CPC ............... *B60L 15/20* (2013.01); *B60L 50/50* (2019.02); *B62K 11/007* (2016.11); *B60L 2200/16* (2013.01); *B60L 2260/34* (2013.01)

(58) Field of Classification Search
CPC .. B60L 15/20; B60L 2200/16; B60L 2260/34; B62K 11/007
USPC ............................................................ 701/22
See application file for complete search history.

(56) References Cited

U.S. PATENT DOCUMENTS

| | | | |
|---|---|---|---|
| 8,543,307 B2 * | 9/2013 | Takenaka | B62K 1/00 73/514.36 |
| 9,101,817 B2 * | 8/2015 | Doerksen | G01P 15/18 |
| 9,452,345 B2 * | 9/2016 | Doerksen | A63C 17/01 |
| 9,891,624 B2 * | 2/2018 | Murakami | G05D 1/0891 |
| 10,518,834 B2 * | 12/2019 | Ha | B60L 3/12 |
| 2005/0126832 A1 * | 6/2005 | Amsbury | B60L 15/20 180/7.1 |
| 2012/0173107 A1 * | 7/2012 | Takenaka | B62K 11/007 701/70 |
| 2014/0326525 A1 * | 11/2014 | Doerksen | A63C 17/26 180/181 |
| 2016/0121198 A1 * | 5/2016 | Doerksen | B62D 51/02 701/22 |
| 2016/0129957 A1 * | 5/2016 | Murakami | G05D 1/0891 701/70 |
| 2018/0029661 A1 * | 2/2018 | Ha | B62J 45/20 |

\* cited by examiner

*Primary Examiner* — Krishnan Ramesh

(74) *Attorney, Agent, or Firm* — Kolitch Romano Dascenzo Gates LLC

(57) ABSTRACT

A control system for a tiltable vehicle may include a motor controller configured to respond to backward or reverse operation of the vehicle by hindering a responsiveness of the control system (e.g., proportionally) and/or eventually disengaging a drive motor of the vehicle. Accordingly, a user may intuitively and safely dismount the vehicle by selectively commanding reverse operation. In some examples, the backward direction may be user-defined.

8 Claims, 13 Drawing Sheets

DISMOUNT CONTROLS FOR ONE-WHEELED VEHICLE

CROSS-REFERENCES

The following applications and materials are incorporated herein, in their entireties, for all purposes: U.S. Provisional Patent Application Ser. No. 62/596,026, filed Dec. 7, 2017; U.S. patent application Ser. No. 16/213,949, filed Dec. 7, 2018, now U.S. Pat. Nos. 10,399,457; and 9,101,817, granted Aug. 11, 2015.

SUMMARY

The present disclosure provides systems, apparatuses, and methods relating to control systems for tiltable vehicles such as self-balancing, one-wheeled skateboards and the like.

In some embodiments, a method for operating a self-balancing electric vehicle includes: receiving, at a motor controller of a self-balancing electric vehicle, orientation information indicating an orientation of a frame of the vehicle, wherein the vehicle comprises exactly one wheel and an electric hub motor configured to drive the wheel, and the frame is tiltable about a pitch axis oriented perpendicular to a direction of vehicle travel; causing the hub motor to propel the vehicle in the direction of travel using the motor controller, based on the orientation information; and responding to an indication that the vehicle is travelling in a reverse direction by automatically turning the hub motor off.

In some embodiments, a method for operating a self-balancing electric vehicle includes: receiving, at a motor controller of a self-balancing electric vehicle, orientation information indicating an orientation of a frame of the vehicle, wherein the vehicle comprises exactly one wheel and an electric hub motor configured to drive the wheel, and the frame is tiltable about a pitch axis oriented perpendicular to a direction of vehicle travel; automatically balancing the vehicle using the motor controller by causing the hub motor to propel the vehicle based on the orientation information; responding to an indication that the vehicle is travelling in a reverse direction by refraining from automatic balancing.

Features, functions, and advantages may be achieved independently in various embodiments of the present disclosure, or may be combined in yet other embodiments, further details of which can be seen with reference to the following description and drawings.

DESCRIPTION

Figure 1:
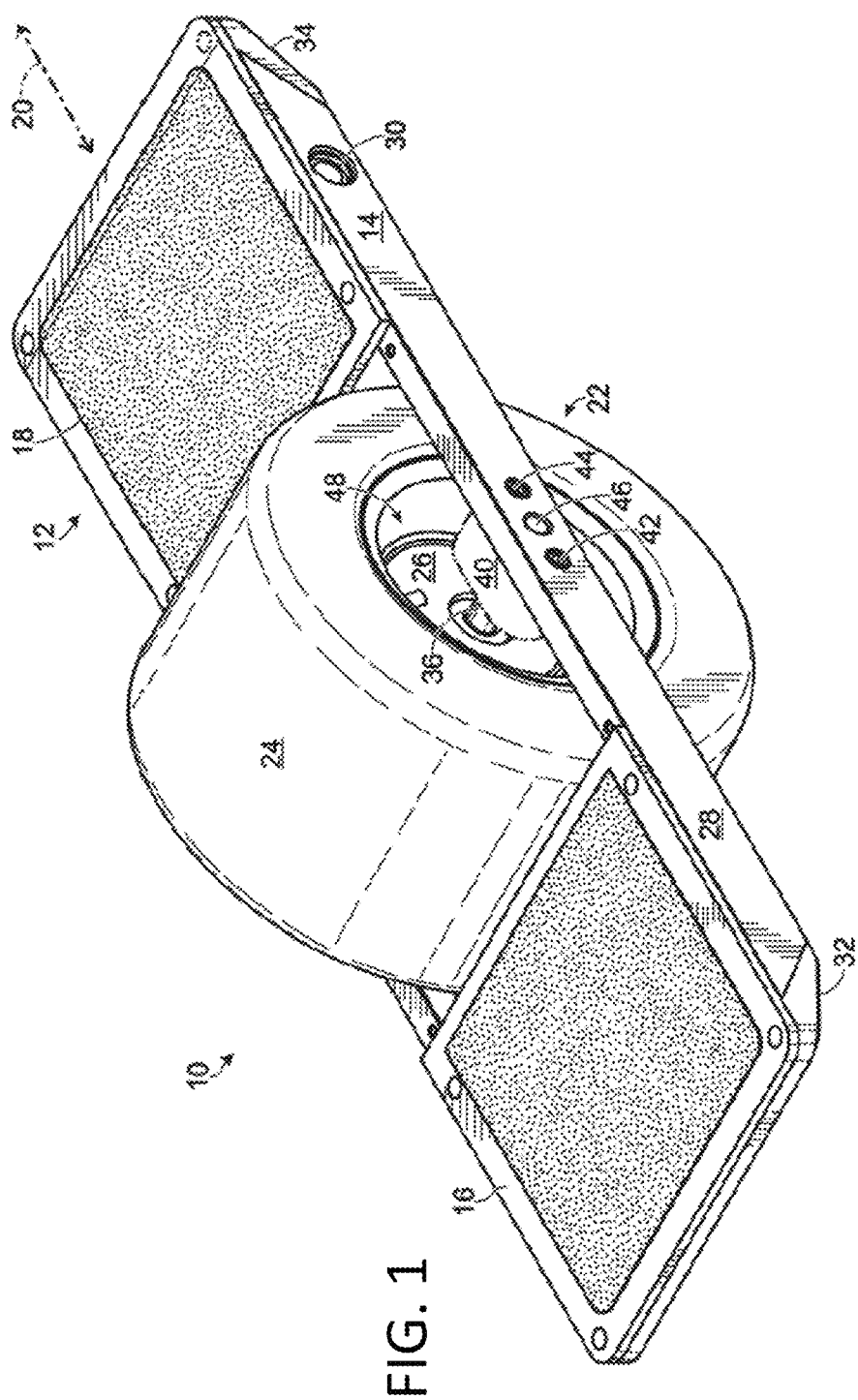
FIG. 1 is an isometric view of an illustrative one-wheeled electric vehicle suitable for use with aspects of the present disclosure.

Various aspects and examples of control systems for one-wheeled vehicles providing improved dismount capabilities, as well as related methods, are described below and illustrated in the associated drawings. Unless otherwise specified, a vehicle or control system described herein, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

"AKA" means "also known as," and may be used to indicate an alternative or corresponding term for a given element or elements.

Terms such as "first", "second", and "third" are used to distinguish or identify various members of a group, or the like, and are not intended to show serial or numerical limitation.

Directional terms such as "up," "down," "forward," "backward," and the like should be understood in the context of the particular vehicle being described.

"Processing logic" may include any suitable device or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

"Coupled" means connected, either permanently or releasably, whether directly or indirectly through intervening components, and is not necessarily limited to physical connection(s).

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a control system for electric vehicles according to the present teachings may include improved features for enhancing the safety and enjoyment of a rider while attempting to stop and dismount the vehicle. Relevant control systems and methods are referred to herein as "reverse-to-dismount," and may be used in combination with the various vehicles, controls, and systems described below.

Aspects of the present control systems may be embodied as a computer method, computer system, or computer program product. Accordingly, aspects of the present control systems may include processing logic and may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the present control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary vehicles and control systems, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Vehicle

FIG. 1 depicts an illustrative electric vehicle 10 that may be suitable for use with a reverse-to-dismount control system in accordance with aspects of the present disclosure. Other electric vehicles may also be suitable.

Vehicle 10 is a one-wheeled, self-stabilizing skateboard substantially similar to the electric vehicles described in U.S. Pat. No. 9,101,817 (the '817 patent), the entirety of which is hereby incorporated herein for all purposes. Accordingly, vehicle 10 includes a board 12 (AKA a tiltable portion of the vehicle) having a frame 14 supporting a first deck portion 16 and a second deck portion 18. Each deck portion 16, 18 is configured to receive a left or right foot of a rider oriented generally perpendicular to a direction of travel of the board (see FIG. 2), said direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, vehicle 10 may include exactly one ground-contacting element.

Frame 14 may include any suitable structure configured to rigidly support the deck portions and to be coupled to an axle of the wheel assembly, such that the weight of a rider may be supported on tiltable board 12 having a fulcrum at the wheel assembly axle. Frame 14 may include one or more frame members 28, on which deck portions 16 and 18 may be mounted, and which may further support additional elements and features of the vehicle, such as a charging port 30, and end bumpers 32, 34, as well as lighting assemblies, battery and electrical systems, electronics, controllers, and the like (see, e.g., FIGS. 5-6 and corresponding description).

Deck portions 16 and 18 may include any suitable structures configured to support the feet of a rider, such as non-skid surfaces, as well as vehicle-control features, such as a rider detection system. In some examples, a rider detection system includes a strain gauge rider detection system. Illustrative deck portions, including other suitable rider detection systems, are described in the '817 patent, as well as in U.S. Pat. No. 9,452,345, the entirety of which is hereby included herein for all purposes.

A shaft 36 of an axle portion of hub motor 26 is coupled to frame 14, as shown in FIG. 1. For example, the shaft may be directly attached to frame 14, or may be coupled to the frame through a connection or mounting block 40 (also referred to as an axle mount). Shaft 36 may be bolted or otherwise affixed to mounting block 40, which in turn may be bolted or affixed to frame 14 (e.g., by bolts 42, 44). A through hole 46 may be provided in frame 14 for access to the connector of shaft 36 to block 40.

Figure 2:
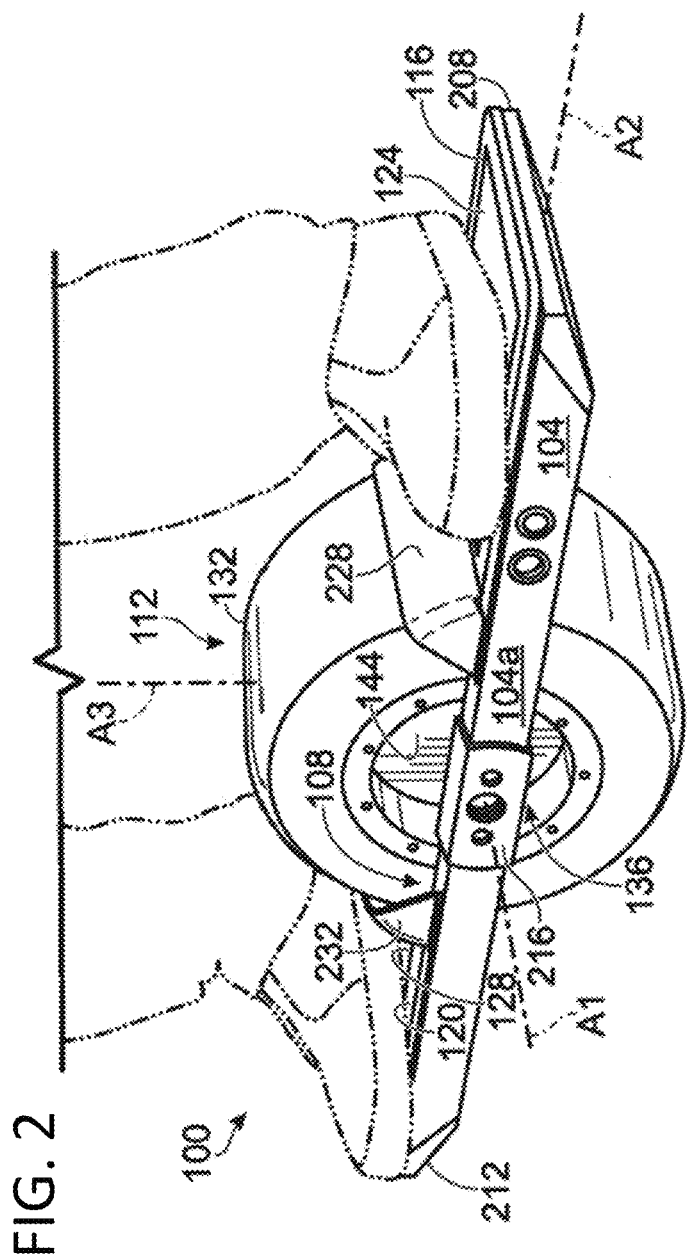
FIG. 2 is an isometric view of another illustrative one-wheeled electric vehicle showing a rider mounted thereon.
Figure 3:
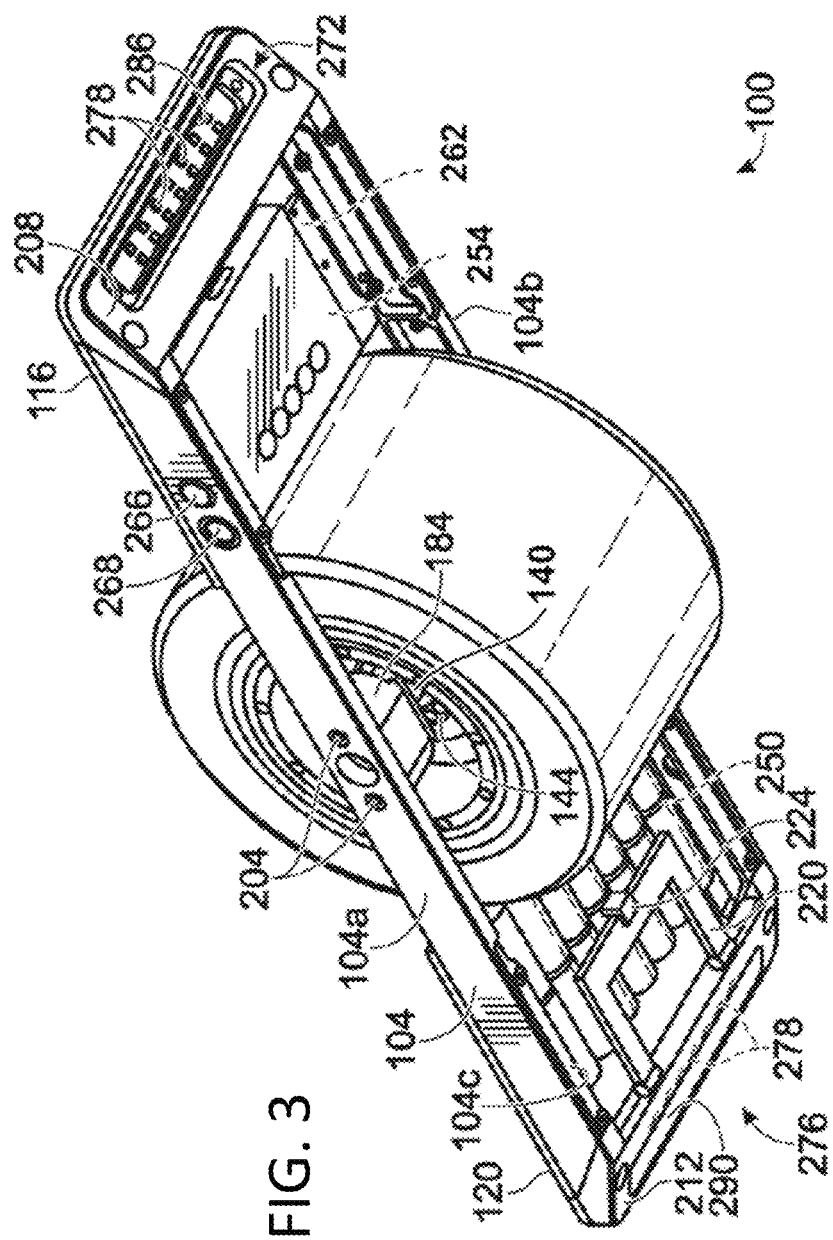
FIG. 3 is a bottom oblique isometric view of the vehicle of FIG. 2.
Figure 4:
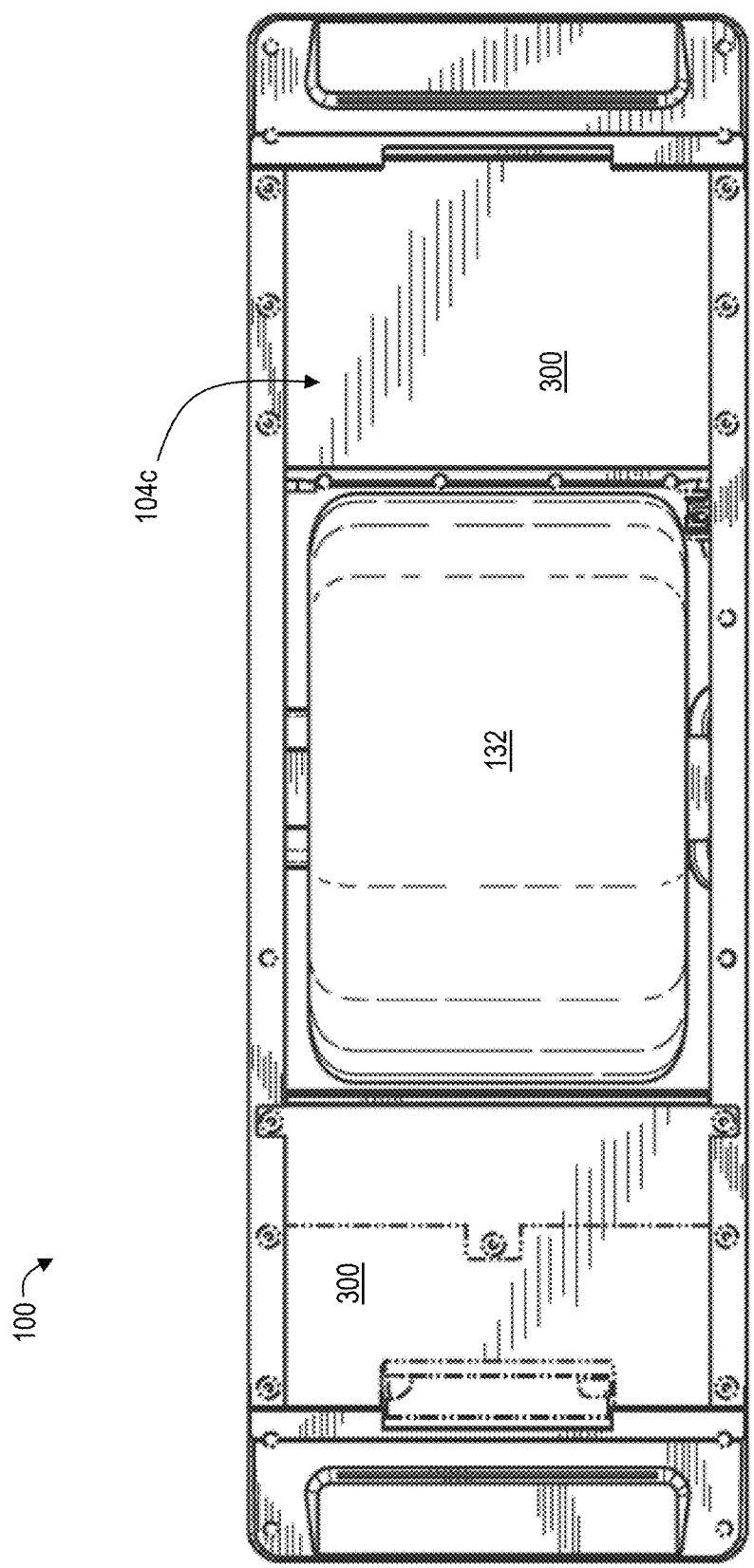
FIG. 4 is a bottom plan view of the vehicle of FIG. 2, with protective covers installed.

FIGS. 2-4 depict another example of a self-balancing electric vehicle substantially similar to vehicle 10, indicated at 100. Vehicle 100 includes a board (or foot deck, or frame, or platform) 104 having an opening 108 for receiving a wheel assembly 112 between first and second deck portions (or footpads) 116, 120. First and second deck portions 116, 120 may be of the same physical piece, or may be separate pieces. First and second deck portions 116, 120 may be included in board 104. First and second deck portions 116, 120 are each configured to support a rider's foot. For example, first and second deck portions 116, 120 may each be configured to receive a left or a right foot of the rider.

Board/frame 104 may define a plane. First deck portion 116 is mounted to frame 104 and configured to support a first foot of the rider. Second deck portion 120 is mounted to frame 104 and configured to support a second foot of the rider.

Wheel assembly 112 is disposed between first and second deck portions 116, 120. First and second deck portions 116, 120 may be located on opposite sides of wheel assembly 112 with board 104 being dimensioned to approximate a skateboard. In other embodiments, the board may approximate a longboard skateboard, snowboard, surfboard, or may be otherwise desirably dimensioned. In some examples, deck portions 116, 120 of board 104 may be covered with non-slip material portions 124, 128 (e.g., 'grip tape') to aid in rider control.

Wheel assembly 112 includes a ground-contacting element (e.g., a tire, wheel, or continuous track) 132. As shown, vehicle 100 includes exactly one ground-contacting element 132, and the exactly one ground-contacting element is disposed between first and second deck portions 116, 120. Ground-contacting element 132 is coupled to a motor assembly 136. Motor assembly 136 is mounted to board 104. Motor assembly 136 includes an axle 140, which is coupled to board 104 by one or more axle mounts and one or more fasteners, such as a plurality of bolts. Motor assembly 136 may be configured to rotate ground-contacting element 132 around (or about) axle 140 to propel vehicle 100. For example, motor assembly 136 may include an electric motor, such as a hub motor 144, configured to rotate ground-contacting element 132 about axle 140 to propel vehicle 100 along the ground.

Vehicle 100 has a pitch axis A1, a roll axis A2, and a yaw axis A3 (see FIG. 2). Pitch axis A1 is the axis about which tire 132 is rotated by motor assembly 136. For example, pitch axis A1 may pass through axle 140 (e.g., pitch axis A1 may be parallel to and aligned with an elongate direction of axle 140). Roll axis A2 is perpendicular to pitch axis A1, and may substantially extend in a direction in which vehicle 100 may be propelled by motor assembly 136. For example, roll axis A2 may extend in an elongate direction of board 104. Yaw axis A3 is perpendicular to pitch axis A1 and to roll axis A2. For example, yaw axis A3 may be normal to a plane defined by deck portions 116, 120, as shown in FIG. 2.

Wheel 132 may be mounted to frame 104 between deck portions 116, 120, and may extend above and below the plane defined by frame 104. Wheel 132 may be configured to rotate about an axis (e.g., pitch axis A1) lying in the plane. In addition, roll axis A2 may lie in the plane defined by frame 104. In some embodiments, the pitch and roll axes may define the plane.

Tire 132 may be wide enough in a heel-toe direction (e.g., in a direction parallel to pitch axis A1), so that the rider can balance in the heel-toe direction using his or her own balance. Tire 132 may be tubeless, or may be used with an inner tube. Tire 132 may be a non-pneumatic tire. For example, tire 132 may be "airless", solid, and/or made of foam. Tire 132 may have a profile such that the rider can lean vehicle 100 over an edge of tire 132 (and/or pivot the board about roll axis A2 and/or yaw axis A3) through heel and/or toe pressure to corner vehicle 100.

Hub motor 144 may be mounted within tire (or wheel) 132 and may be internally geared or may be direct-drive. The use of a hub motor may eliminate chains and belts, and may enable a form factor that considerably improves maneuverability, weight distribution, and aesthetics. Mounting tire 132 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

With continuing reference to FIGS. 2-3, a first skid pad 208 may be integrated into (or connected to) a first end of board 104 proximal first deck portion 116, and a second skid pad 212 may be integrated into (or connected to) a second end of board 104 proximal second deck portion 120. Skid pads 208, 212 may be replaceable and/or selectively removable. For example, the skid pads may include replaceable polymer parts or components. In some embodiments, the skid pads may be configured to allow the rider to bring vehicle 100 to a stop in an angled orientation (e.g., by setting one end of the board against the ground after the rider removes their foot from a rider detection device or switch, which is described below in further detail). The respective skid pad may be worn by abrasion with the surface of the ground as that end of the board is set against (or brought into contact with) the ground.

Vehicle 100 may include one or more side-skid pads configured to protect the paint or other finish on board 104, and/or otherwise protect vehicle 100 if, for example, vehicle 100 is flipped on its side and/or slides along the ground on its side. For example, the one or more side-skid pads may be removably connected to one or more opposing longitudinal sides of the board (e.g., extending substantially parallel to the roll axis). FIG. 2 shows a first side-skid pad 216 connected to a first longitudinal side 104a of board 104. In FIG. 3, side-skid pad 216 has been removed from first longitudinal side 104a. A second side-skid pad (not shown) may be similarly removably connected to a second longitudinal side 104b (see FIG. 3) of board 104 opposite first longitudinal side 104a. The side-skid pads may be incorporated into the electric vehicle as one or more removable parts or components, and/or may be or include replaceable polymer parts or components.

A removable connection of the skid pads and/or the side-skid pads to the board may enable the rider (or other user) to selectively remove one or more of these pads that become worn with abrasion, and/or replace the worn pad(s) with one or more replacement pads.

As shown in FIG. 3, vehicle 100 may include a handle 220. Handle 220 may be disposed on an underside 104c of board 104. Handle 220 may be integrated into a housing or enclosure of one or more of the electrical components.

In some embodiments, handle 220 may be operable between IN and OUT positions. For example, handle 220 may be pivotally connected to board 104, with the IN position corresponding to handle 220 substantially flush with underside 104c of board 104, and the OUT position corresponding to handle 220 pivoted (or folded) away from underside 104 such that handle 220 projects away from deck portion 120.

Vehicle 100 may include any suitable mechanism, device, or structure for releasing handle 220 from the IN position. For example, vehicle 100 may include a locking mechanism 224 that is configured to operate handle 220 between a LOCKED state corresponding to handle 220 being prevented from moving from the IN position to the OUT position, and an UNLOCKED state corresponding to handle 220 being allowed to move from the IN position to the OUT position. In some embodiments, the rider may press locking mechanism 224 to operate the handle from the LOCK state to the UNLOCKED state. The rider may manually move handle 220 from the IN position to the OUT position. The rider may grasp handle 220, lift vehicle 100 off of the ground, and carry vehicle 100 from one location to another.

In some embodiments, handle 220 may include a biasing mechanism, such as a spring, that automatically forces handle 220 to the OUT position when operated to the UNLOCKED state. In some embodiments, locking mechanism 224 may be configured to selectively lock handle 220 in the OUT position.

Vehicle 100 may include any suitable apparatus, device, mechanism, and/or structure for preventing water, dirt, or other road debris from being transferred by the ground-contacting element to the rider. For example, as shown in FIG. 2, vehicle 100 may include first and second partial fender portions 228, 232. Portion 228 is shown coupled to first deck portion 116, and portion 232 is shown coupled to second deck portion 120. Portion 228 may prevent debris from being transferred from tire 132 to a portion of the rider positioned on or adjacent deck portion 116, such as when tire 132 is rotated about pitch axis A1 in a counter-clockwise direction. Portion 232 may prevent debris from being transferred from tire 132 to a portion of the rider positioned on or adjacent deck portion 120, such as when tire 132 is rotated about pitch axis A1 in a clockwise direction.

Additionally and/or alternatively, vehicle 100 may include a full fender (not shown). A full fender may be configured to prevent a transfer of debris from the ground-contacting element to the rider. A full fender and/or fender portions 228, 232 may be attached to at least one of deck portions 116, 120 and configured to prevent water traversed by wheel 132 from splashing onto the rider. A suitable fender may be attached to one or both of deck portions 116, 120, and may substantially entirely separate wheel 132 from the rider.

Fenders may include a resilient fender. For example, fenders may include (or be) a sheet of substantially flexible or resilient material, such as plastic. A first side of the resilient material may be coupled to deck portion 116 (or board 104 proximate deck portion 116), and a second side of the resilient material may be coupled to deck portion 120 (or board 104 proximate deck portion 120).

Figure 5:
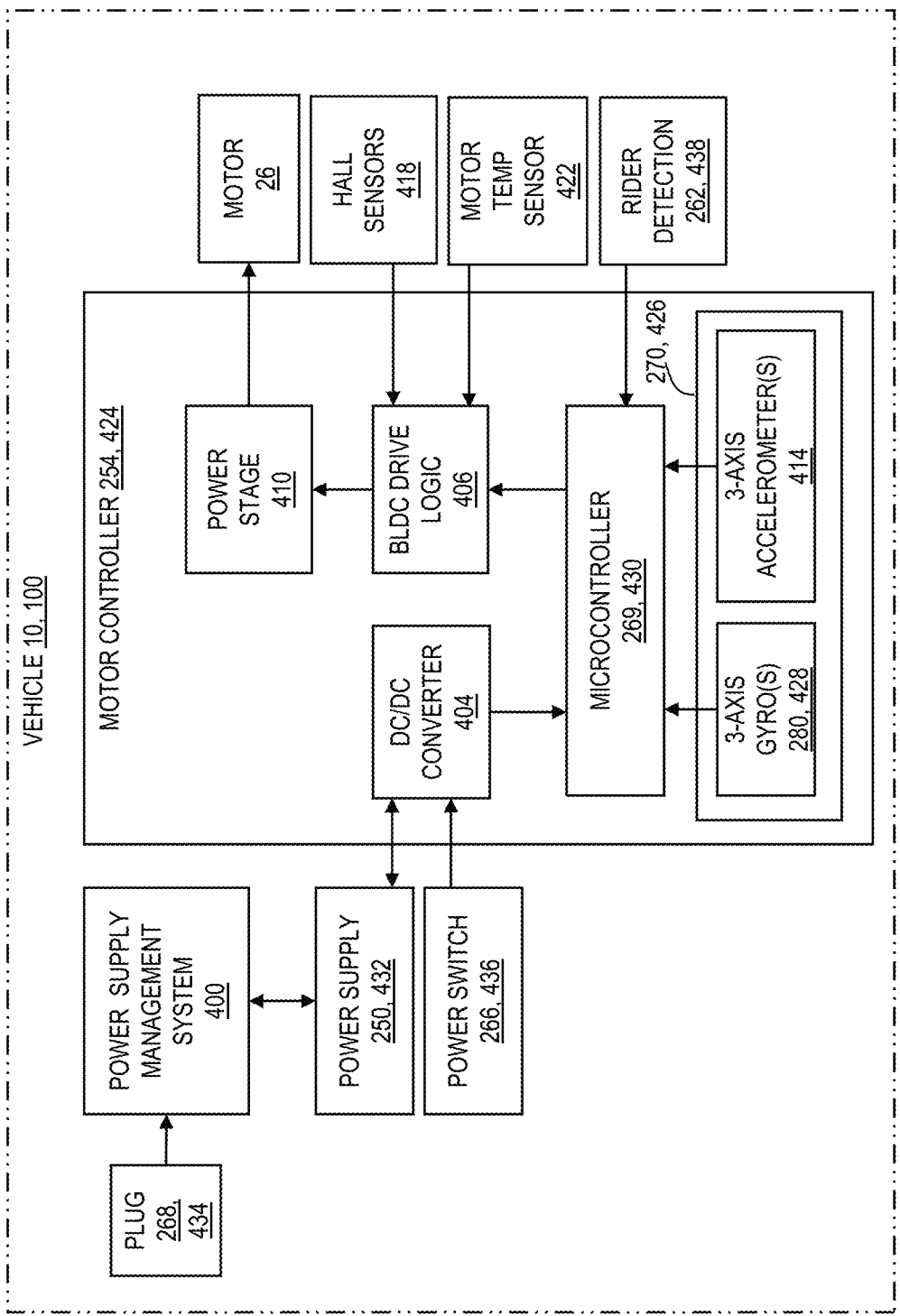
FIG. 5 is a schematic diagram of illustrative electrical controls of the vehicles of FIGS. 1-4.

As indicated in FIGS. 3 and 5, the one or more electrical components of vehicle 100 may include a power supply 250, a motor controller 254, a rider detection device 262, a power switch 266, and a charge plug 268. Power supply 250 may include one or more batteries (e.g., rechargeable batteries) which may be re-chargeable, such as one or more lithium batteries that are relatively light in weight and have a relatively high power density. In some examples, power supply 250 may include one or more lithium iron phosphate batteries, one or more lithium polymer batteries, one or more lithium cobalt batteries, one or more lithium manganese batteries, or a combination thereof. For example, power supply 250 may include sixteen (16) A123 lithium iron phosphate batteries (e.g., size 26650). The batteries of power supply 250 may be arranged in a 16S1P configuration. A microcontroller 269 and/or one or more sensors (or at least one sensor) 270 may be included in or connected to motor controller 254 (see FIG. 4). At least one of sensors 270 may be configured to measure orientation information (or an orientation) of board 104. For example, sensors 270 may be configured to sense movement of board 104 about and/or along the pitch, roll, and/or yaw axes. The motor may be configured to cause rotation of wheel 132 based on the orientation of board 104. In particular, motor controller 254 may be configured to receive orientation information measured by the at least one sensor of sensors 270 and to cause motor assembly 254 to propel the electric vehicle based on the orientation information. For example, motor controller 254 may be configured to drive hub motor 144 based on received sensed movement of board 104 from sensors 270 via microcontroller 269 to propel and/or actively balance vehicle 100.

One or more of the electrical components may be integrated into board 104. For example, board 104 may include a first environmental enclosure that may house power supply 250, and a second environmental enclosure that may house motor controller 254, and rider detection device 262. The environmental enclosures may protect the one or more electrical components from being damaged, such as by water ingress.

Vehicle 100 may include one or more light assemblies, such as one or more headlight and/or taillight assemblies. For example, a first headlight/taillight assembly (or first light assembly) 272 may be disposed on or at (and/or connected to) a first end portion of board 104 (e.g., at a distal end portion of first deck portion 116), and a second headlight/taillight assembly 276 may be disposed on or at (and/or connected to) a second end portion of board 104 (e.g., at a distal end portion of second deck portion 120). The second end portion of board 104 may be opposite the first end portion.

Headlight/taillight assemblies 272, 276 may be configured to reversibly light vehicle 100. For example, assemblies 272, 276 may indicate the direction that vehicle 100 is moving by changing color. For example, the headlight/taillight assemblies may each include one or more high output red and white LEDs (or other suitable one or more illuminators) 278 configured to receive data from microcontroller 269 (and/or a pitch sensor or sensors 270, such as a 3-axis gyro 280) and automatically change color from red to white (or white to red, or a first color to a second color) based on the direction of movement of vehicle 100, with white LEDs (or a first color) shining in the direction of motion and red LEDs (or a second color) shining backward (e.g., opposite the direction of motion). For example, one or more of the headlight/taillight assemblies (e.g., their respective illuminators) may be coupled to microcontroller 269 via an LED driver, which may be included in or connected to motor controller 254. In some embodiments, the illuminators may include RGB/RGBW LEDs.

Illuminators 278 may be located in and/or protected by skid pads 208, 212, as shown in FIG. 3. For example, skid pads 208, 212 may include respective apertures 286, 290. Illuminators 278 may be disposed in and shine through respective apertures 286, 290. Apertures 286, 290 may be dimensioned to prevent illuminators 278 from contacting the ground. For example, apertures 286, 290 may each have a depth that is greater than a height of illuminators 278. In some embodiments, the illuminators may be separable from the associated skid pad, so that the skid pads may be removed without removing the illuminators.

As shown in FIG. 3, first skid pad 208 and a first illuminator 278 are disposed at a distal end of first deck portion 116, and second skid pad 212 and a second illuminator 278 are disposed at a distal end of second deck portion 120. Each of skid pads may include an aperture (e.g., skid pad 208 may include aperture 286, and skid pad 212 may include aperture 290, as mentioned above) configured to allow light from the corresponding illuminator to shine through while preventing the illuminator from contacting the ground.

B. Illustrative Electrical Controls

FIG. 5 shows a block diagram of various illustrative electrical components of vehicle 10 or 100, including onboard controls, some or all of which may be included in the vehicle. For convenience, vehicle 10 is sometimes referenced below, with the understanding that similar or identical components may exist on vehicle 100 and others. See FIG. 5 for corresponding reference numbers from Section A.

The electrical components may include a power supply management system 400, a direct current to direct current (DC/DC) converter 404, a brushless direct current (BLDC) drive logic 406, a power stage 410, one or more 3-axis accelerometers 414, one or more Hall sensors 418, and/or a motor temperature sensor 422. DC/DC converter 404, BLDC drive logic 406, and power stage 410 may be included in and/or connected to a motor controller 424. Accelerometer(s) 414 may be included in sensors 270.

Active balancing (or self-stabilization) of the electric vehicle may be achieved through the use of a feedback control loop or mechanism. The feedback control mechanism may include sensors 426, which may be electrically coupled to and/or included in motor controller 424. Preferably, the feedback control mechanism includes a Proportional-Integral-Derivative (PID) control scheme using one or more gyros 428 and one or more accelerometers (e.g., accelerometer(s) 414). Gyro 428 may be configured to measure a pivoting of the foot deck or board about its pitch axis (also referred to as the fulcral axis). Gyro 428 and accelerometer 414 may be collectively configured to estimate (or measure, or sense) a lean angle of board 12, such as an orientation of the foot deck about the pitch, roll and/or yaw axes. In some embodiments, the gyro and accelerometer 414 may be collectively configured to sense orientation information sufficient to estimate the lean angle of frame 14, including pivotation about the pitch, roll and/or yaw axes.

As mentioned above, orientation information of board 12 may be measured (or sensed) by gyro 428 and accelerometer 414. The respective measurements (or sense signals) from gyro 428 and accelerometer 414 may be combined using a complementary or Kalman filter to estimate a lean angle of board 12 (e.g., pivoting of board 12 about the pitch, roll, and/or yaw axes, with pivoting about the pitch axis corresponding to a pitch angle (e.g., about axle 140 or 36), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 428 and accelerometer 414 may be connected to microcontroller 430, which may be configured to correspondingly measure movement of board 12 about and along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 26 to reduce an angle of board 12 with respect to the ground. For example, if a rider were to angle board 12 downward, so that first deck portion 16 was 'lower' than second deck portion 18 (e.g., if the rider pivoted board 12 counterclockwise (CCW) about axle 34 in FIG. 1), then the feedback loop may drive motor 26 to cause CCW rotation of tire 24 about the pitch axis (i.e., axle 36) and a clockwise force on board 12.

Thus, motion of the electric vehicle may be achieved by the rider leaning his or her weight toward a selected (e.g., "front") foot. Similarly, deceleration may be achieved by the rider leaning toward the other (e.g., "back") foot. Regenerative braking can be used to slow the vehicle. Sustained operation may be achieved in either direction by the rider maintaining their lean toward either selected foot.

As indicated in FIG. 30, microcontroller 430 may be configured to send a signal to brushless DC (BLDC) drive logic 406, which may communicate information relating to the orientation and motion of board 12. BLDC drive logic 406 may then interpret the signal and communicate with power stage 410 to drive motor 26 accordingly. Hall sensors 418 may send a signal to the BLDC drive logic to provide feedback regarding a substantially instantaneous rotational rate of the rotor of motor 26. Motor temperature sensor 422 may be configured to measure a temperature of motor 26 and send this measured temperature to logic 406. Logic 406 may limit an amount of power supplied to motor 26 based on the measured temperature of motor 26 to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of board 12).

Alternatively or additionally, some embodiments may include neural network control, fuzzy control, genetic algorithm control, linear quadratic regulator control, state-dependent Riccati equation control, and/or other control algorithms. In some embodiments, absolute or relative encoders may be incorporated to provide feedback on motor position.

During turning, the pitch angle can be modulated by the heel-toe angle (e.g., pivoting of the board about the roll axis), which may improve performance and prevent a front inside edge of board 104 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., zero degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 5, the various electrical components may be configured to manage a power supply 432. For example, power supply management system 400 may be a battery management system configured to protect batteries of power supply 432 from being overcharged, over-discharged, and/or short-circuited. System 400 may monitor battery health, may monitor a state of charge in power supply 432, and/or may increase the safety of the vehicle. Power supply management system 400 may be connected between a charge plug 434 of vehicle 10 and power supply 432. The rider (or other user) may couple a charger to plug 434 and re-charge power supply 432 via system 400.

In operation, power switch 436 may be activated (e.g., by the rider). Activation of switch 436 may send a power-on signal to converter 404. In response to the power-on signal, converter 404 may convert direct current from a first voltage level provided by power supply 432 to one or more other voltage levels. The other voltage levels may be different than the first voltage level. Converter 404 may be connected to the other electrical components via one or more electrical connections to provide these electrical components with suitable voltages.

Converter 404 (or other suitable circuitry) may transmit the power-on signal to microcontroller 430. In response to the power-on signal, microcontroller may initialize sensors 426, and a rider detection device 438.

The electric vehicle may include one or more safety mechanisms, such as power switch 438 and/or rider detection device 438 to ensure that the rider is on the board before engaging the feedback control loop. In some embodiments, rider detection device 438 may be configured to determine if the rider's feet are disposed on the foot deck, and to send a signal causing motor 26 to enter an active state when the rider's feet are determined to be disposed on the foot deck.

Rider detection device 438 may include any suitable mechanism, structure, or apparatus for determining whether the rider is on the electric vehicle. For example, device 438 may include one or more mechanical buttons, one or more capacitive sensors, one or more inductive sensors, one or more optical switches, one or more force resistive sensors, and/or one or more strain gauges. Rider detection device 438 may be located on or under either or both of first and second deck portions 116, 120. In some examples, the one or more mechanical buttons or other devices may be pressed directly (e.g., if on the deck portions), or indirectly (e.g., if under the deck portions), to sense whether the rider is on board 104. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 438 may include a hand-held "dead-man" switch.

If device 438 detects that the rider is suitably positioned on the electric vehicle, then device 438 may send a rider-present signal to microcontroller 430. The rider-present signal may be the signal causing motor 26 to enter the active state. In response to the rider-present signal (and/or, for example, the board being moved to the level orientation), microcontroller 430 may activate the feedback control loop for driving motor 26. For example, in response to the rider-present signal, microcontroller 430 may send board orientation information (or measurement data) from sensors 426 to logic 406 for powering motor 26 via power stage 410.

In some embodiments, if device 438 detects that the rider is no longer suitably positioned or present on the electric vehicle, device 438 may send a rider-not-present signal to microcontroller 430. In response to the rider-not-present signal, circuitry of vehicle 10 (e.g., microcontroller 430, logic 406, and/or power stage 410) may be configured to reduce a rotational rate of the rotor relative to the stator to bring vehicle 10 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 26 even though the rider may not be present on the vehicle (e.g., temporarily), which may allow the rider to perform various tricks. For example, device 438 may be configured to delay sending the rider-not-present signal to the microcontroller for a predetermined duration of time, and/or the microcontroller may be configured to delay sending the signal to logic 406 to cut power to the motor for a predetermined duration of time.

C. Illustrative Control Methods

Figure 6:
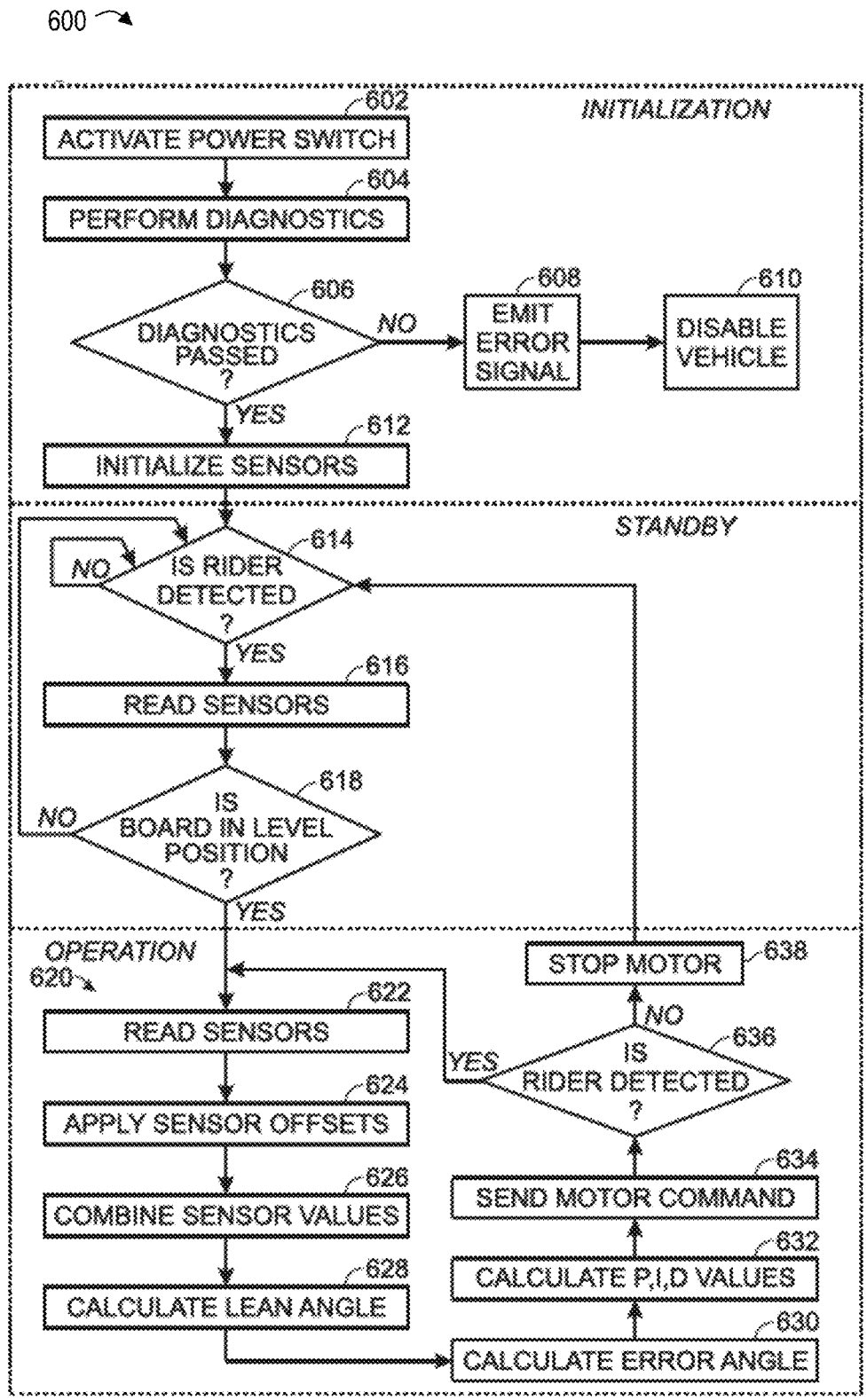
FIG. 6 is a flowchart depicting exemplary initialization, standby, and operation procedures of the electrical components.

FIG. 6 depicts multiple steps of an illustrative method, generally indicated at 600, which may be performed by and/or in conjunction with vehicle 10 and/or 100. Although various steps of method 600 are described below and depicted in FIG. 6, the steps need not necessarily all be performed, and in some cases may be performed simultaneously or in a different order than the order shown. Although vehicle 100 is referenced below, method 600 may be performed in conjunction with vehicle 10 and others.

Method 600 includes an initialization procedure, a standby procedure, and an operation procedure, as depicted in FIG. 6. The initialization procedure includes a step 602 of activating a power switch. For example, at step 602, the rider may press switch 266 (see FIG. 3). The initialization procedure then flows to a step 604 of performing one or more diagnostics. For example, circuitry of vehicle 100 may perform one or more diagnostic tests to determine whether the one or more electrical components are properly operational. For example, at step 604, motor controller 254 may perform a self-diagnostic to determine whether components thereof, such as the power stage, are operational.

The initialization procedure includes a step 606 of determining whether the diagnostics performed at step 606 were passed. If it is determined at step 606 that the diagnostics were not passed, then method 600 may flow to a step 608 of emitting an error signal, and/or a step 610 of disabling the vehicle. For example, vehicle 100 may emit an audible buzz via the buzzer mechanism or emit a light signal (e.g., by flashing illuminators 278) if it is determined that the diagnostics were not passed, and may prevent motor controller 254 from powering motor 144. In some embodiments, disabling the vehicle may involve locking the rotor relative to the stator. For example, the motor controller may continuously energize the electric coils of the stator with a substantially constant current to prevent the rotor from rotating relative to the stator. However, if it is determined at step 606 that the diagnostics were passed, then the initialization procedure may flow to a step 612 of initializing sensors 270.

Figure 7:
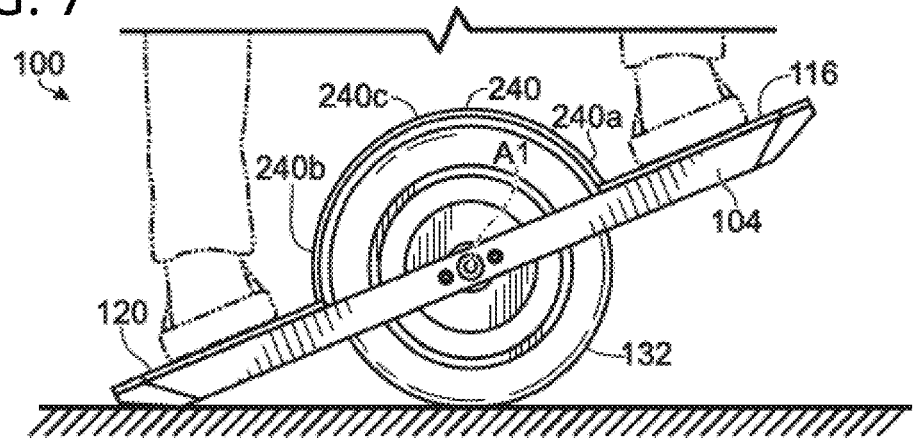
FIG. 7 is a side elevation view of the electric vehicle in a first orientation.

As shown in FIG. 6, the initialization procedure flows to the standby procedure. The standby procedure includes a step 614 of determining whether a rider is detected. For example, circuitry of vehicle 100 may determine whether the rider is detected as being suitably positioned on board 104 (e.g., with one foot on first deck portion 116, and the other foot on second deck portion 120, as shown in FIG. 7), based on a received signal from rider detection device 262. If it is determined at step 614 that the rider is not detected on the vehicle, then step 614 may be repeated until a rider is detected. In some embodiments, device 262 may substantially continuously send the rider-present signal to the circuitry when the rider is positioned on the vehicle, and/or may substantially continuously send the rider-not-present signal to the circuitry when the rider is not positioned on the vehicle. In some embodiments, device 262 may intermittently send these signals based on the position of the rider.

If it is determined at step 614 that a rider is detected as suitably positioned on board 104, as is shown in FIG. 7, then the standby procedure may flow to a step 616 of reading or acquiring one or more measurements (e.g., orientation information) from sensors 270 (e.g., gyro 280 and accelerometer 314).

The standby procedure may include a step 618 of determining whether board 104 is in the level orientation (or other predefined and/or predetermined orientation). Circuitry of vehicle 100 may determine whether board 104 is in the level orientation based on the measurements acquired from sensors 270 at step 616. If it is determined at step 618 that board 104 is not in the level orientation, as is shown in FIG. 7, then the standby procedure may return to step 614.

Figure 8:
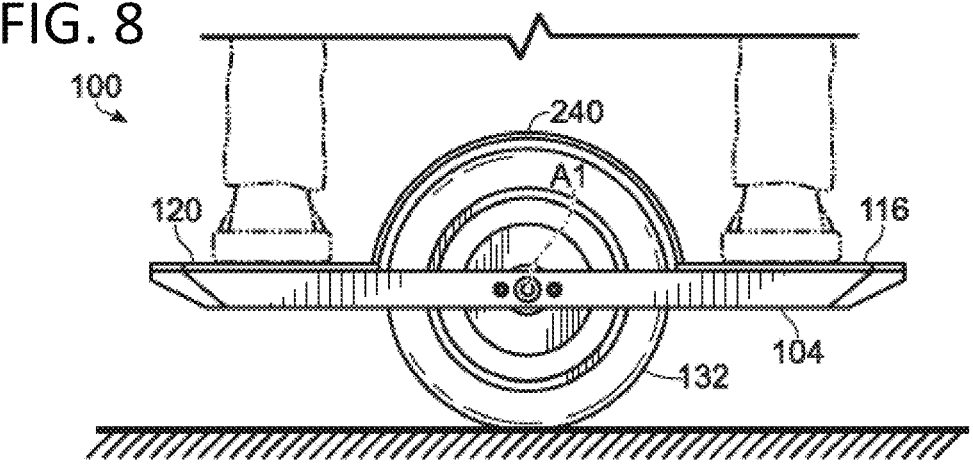
FIG. 8 is a side elevation view of the electric vehicle moved to a second orientation to activate a control loop for the hub motor.

However, if it is determined at step 618 that board 104 is in the level orientation, as is shown in FIG. 8, then the standby procedure may flow to the operation procedure (e.g., to initialize self-balancing of the vehicle) via the feedback control loop, an example of which is generally indicated at 620 in FIG. 6. Loop 620 may be a closed-loop balancing routine, which may be repeated until the rider is no longer detected.

Loop 620 may include a step 622 of reading or acquiring one or more measurements from sensors 270. For example, at step 622, microcontroller 269 (or other circuitry) may acquire acceleration measurements of board 104 along the pitch, roll, and yaw axes from accelerometer 314, and may acquire position measurements of board 104 about the pitch, roll, and yaw axes from gyro 280.

Loop 620 may include a step 624 of applying sensor offsets to one or more of the measurements acquired at step 622. For example, offsets for the accelerometer and the gyro may be determined at step 612 during initialization, which may be applied at step 624 to the measurements acquired at step 622 to substantially correct sensor bias.

Loop 620 may include a step 626 of combining sensor values. For example, at step 626, microcontroller 269 may combine measurements from accelerometer 314 and gyro 280 acquired at step 622 (including or not including the applied offsets) with the complementary or Kalman filter.

Loop 620 may include a step 628 of calculating (or determining) the lean angle of board 104. At step 628, microcontroller 628 may determine the lean angle based on the combined measurements from accelerometer 314 and gyro 280.

Figure 9:
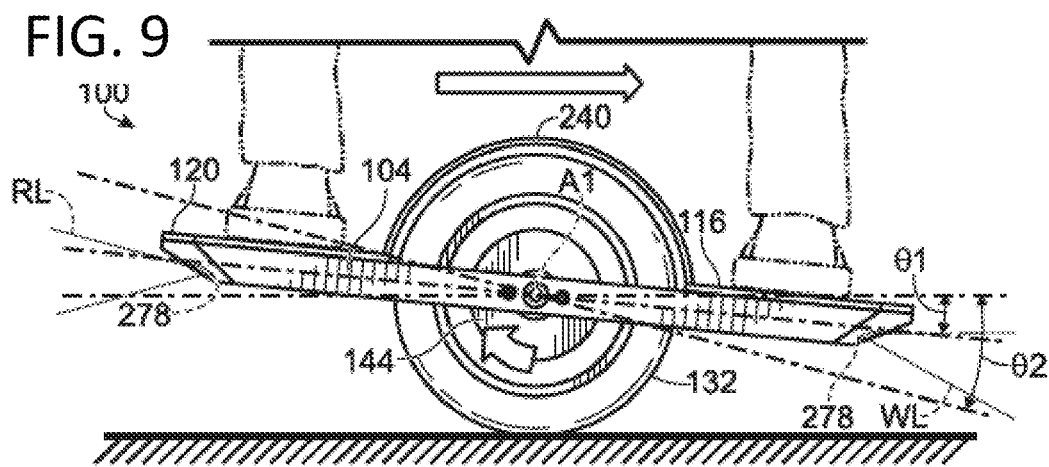
FIG. 9 is a side elevation view of the electric vehicle moved to a third orientation to drive the hub motor in a clockwise direction.

As described above, the lean angle may include the pitch, roll, and yaw angles of board 104. As shown in FIG. 9, the rider may pivot board 104 about pitch axis A1 to produce a pitch angle θ1, in which case at step 630, the microcontroller may determine that board 104 has pitch angle θ1 based on combined measurements (e.g., orientation information) from accelerometer 314 and gyro 280. As shown, the pitch angle may be determined based on an orientation of board 104 with respect to the level orientation. The level orientation may be determined or calculated based on a measured gravity vector.

Loop 620 may include a step 630 of calculating an error angle. The error angle may be an estimate or calculation of a displacement of the board from the level orientation based on orientation information from sensors 270. For example, in the orientation shown in FIG. 9, the microcontroller may determine that pitch angle θ1 is the error angle. At step 630, microcontroller 269 may calculate (or determine) the error angle with respect to a gravity vector measurement acquired from accelerometer 314.

Loop 620 may include a step 632 of calculating P, I, and D values for the PID control scheme. These values may be used to filter out impacts from bumps on the ground, road texture, and/or disturbances due to unintentionally sudden steering inputs.

Loop 620 may include a step 634 of sending a motor command (or motor control signal) to motor 144. At step 634, the motor controller may generate the motor control signal in response to the orientation information received sensors 270. Motor 144 may be configured to receive the motor control signal from motor controller 254 and to rotate wheel 132 in response to the orientation information.

For example, at step 634, microcontroller 269 may send a signal to logic 306 including information corresponding to the calculated lean angle, the calculated error angle (which may be the calculated lean angle or a percentage thereof), and/or the calculated P, I, D values. Based on this information, BLDC drive logic 306 may determine how to accordingly drive motor 144. For example, logic 306 may determine that the rotor of motor 144 should be driven in a clockwise direction (in FIG. 9) at a first rate, based on pitch or error angle θ1, to attempt to move board 104 back to the level orientation, and send a corresponding motor command to power stage 310. Power stage 310 may then accordingly power motor 144 via phase wires 202 (see FIG. 3). If the rider maintains downward pressure on deck portion 116, the clockwise rotation of the rotor of motor 144 may result in rightward propulsion of vehicle 100 in FIG. 9.

As shown in FIG. 9, in response to the motor command, illuminators 278 coupled to deck portion 116 may emit white light WL, and illuminators 278 coupled to deck portion 120 may emit red light RL, as vehicle 100 moves rightward.

Referring back to FIG. 6, loop 620 may include a step 636 of determining whether the rider is detected (e.g., as suitably positioned on board 104). The microcontroller may make this determination based on a signal from the rider detection device, for example, in a manner similar to that of step 614. In some embodiments, the determination of whether the rider is detected may be based on motor torque (e.g., a reduction of motor torque below a predefined threshold), or vehicle orientations that may indicate that the electric vehicle is not under rider control (e.g., excessive pitch, roll, and/or yaw angle or modulation thereof).

At step 636, if it is determined that the rider is not detected (e.g., has fallen, jumped, or otherwise dismounted the electric vehicle), then the operation procedure may flow to a step 638 of stopping motor 144, and return to step 614. At step 638, stopping the motor may involve locking the rotor relative to the stator, such that the ground-contacting element (e.g., the tire) stops rotating around the pitch axis relative to the board. For example, at step 638, the motor controller may energize the electric coils of the stator with a substantially continuous, constant, and/or relatively strong electric current to produce a substantially constant and/or strong electromagnetic field for stopping rotation of the magnets of the rotor around the pitch axis relative to the stator.

However, if it is determined at step 363 that the rider is detected (e.g., is still suitably positioned on the electric vehicle), then loop 620 may return to step 622, and loop 620 may be repeated. For example, in a subsequent repetition of loop 620, the rider may have moved board 104 to an orientation having a pitch angle θ2 (see FIG. 9). Pitch angle θ2 may correspond to further pivoting (AKA pivotation) of board 104 about pitch axis A1 relative to the orientation of board 104 shown in FIG. 9, such that deck portion 116 has been moved further below the level orientation, and deck portion 120 has been moved further above the level orientation. In this subsequent repetition of loop 620, circuitry of vehicle 100 may power the rotor in a clockwise direction at a second rate, based on pitch angle θ2, to attempt to move board 104 back to the level orientation. The second rate may be greater than the first rate.

Figure 10:
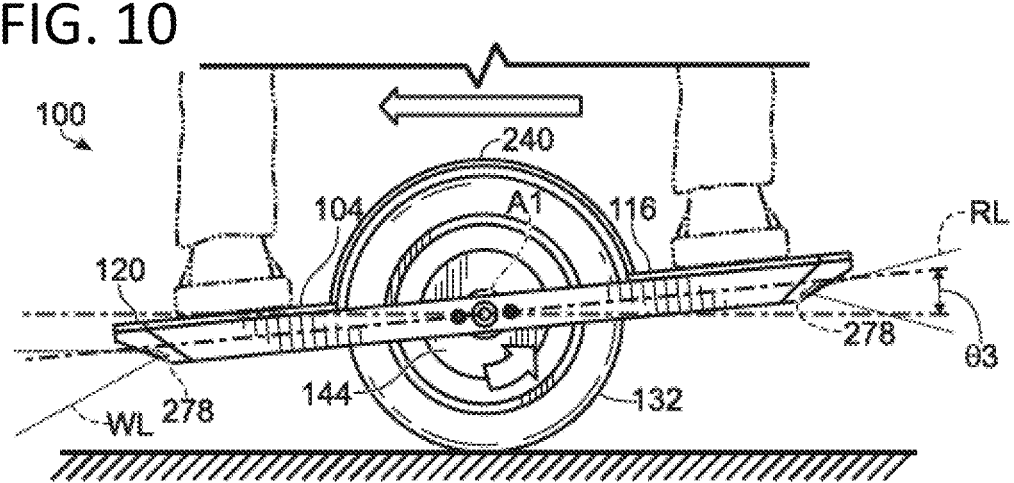
FIG. 10 is a side elevation view of the electric vehicle moved to a fourth orientation to drive the hub motor in a counter-clockwise direction.

In another subsequent repetition of loop 620, the rider may have moved board 104 to an orientation having a pitch angle θ3 (see FIG. 10). As shown, pitch angle θ3 corresponds to pivoting of board 104 about pitch axis A1, such that deck portion 120 has been moved below the level orientation, and deck portion 116 has been moved above the level orientation. In this subsequent repetition of loop 620, circuitry of vehicle 100 may power the rotor of motor 144 to rotate in a counter-clockwise direction (as indicated in FIG. 10) at a third rate, based on pitch angle θ3, to attempt to move board 104 back to the level orientation. If the rider maintains downward pressure on deck portion 120, the counter-clockwise rotation of the rotor of motor 144 may result in leftward propulsion of vehicle 100 in FIG. 10. An absolute value of the third rate may correspond to a greater rate than an absolute value of the first rate, as angle θ3 in FIG. 10 is shown to have a larger magnitude than angle θ1 in FIG. 9. Similarly, an absolute value of the third rate may correspond to a lesser rate than an absolute value of the second rate, as angle θ3 is shown to have a smaller magnitude than angle θ2 in FIG. 9.

Figure 11:
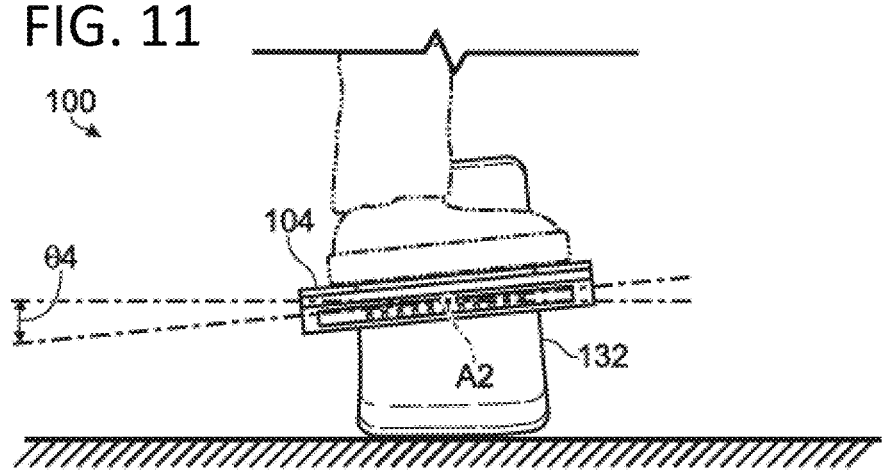
FIG. 11 is a semi-schematic front elevation view of the electric vehicle moved to a fifth orientation to modulate a rotational rate of the hub motor.

Vehicle 100 may include a turn compensation feature. The turn compensation feature may adjust a rate at which motor 144 is driven based on the roll angle of board 104. For example, the rider may pivot board 104 from the level orientation to a rolled orientation about roll axis A2, as shown in FIG. 11, by changing heel and/or toe pressure applied to board 104, resulting in a roll angle θ4, in which case, step 628 of FIG. 6 may involve calculating roll angle θ4 based on orientation information from sensors 270. If board 104 is also pivoted about the pitch axis (e.g. has pitch angle θ1 or θ3, as shown respectively in FIGS. 9 and 10), then at step 634 of FIG. 6, the circuitry may send an increased amount of power to motor 144 based on roll angle θ4 to increase the rotational rate of the rotor and thus tire 132. A magnitude of the increased amount of power may be based on a magnitude of the roll angle, with a greater roll angle magnitude corresponding to a greater increase in power, and a lesser roll angle magnitude corresponding to a lesser increase in power.

D. Illustrative Operation

FIGS. 7-12 show an illustrative process of operating vehicle 100 (or vehicle 10). FIG. 7 shows the rider on board 104 in a starting orientation. The starting orientation may correspond to one of the rider's feet pressing downward on deck portion 120 to brace deck portion 120 against the ground, and the other of the rider's feet positioned on deck portion 116. As shown, the rider's right foot is pressing downward on deck portion 120, and the rider's left foot is contacting deck portion 116. However, board 104 may be configured to allow the rider to operate vehicle 100 in a "switch" stance, with their left foot on deck portion 120, and their right foot on deck portion 116. In (or prior to) the starting position, the rider may power-on vehicle 100 by pressing switch 266 (see FIG. 4). In the starting position, circuitry of vehicle 100 may prevent or hinder rotation of the rotor relative to the stator, for example, by powering the electric coils with a relatively strong and substantially continuously constant current (and/or mechanically locking and/or creating increased friction between the rotor and the stator), which may assist the rider in moving board 104 to the level orientation. The circuitry of vehicle 100 may be configured to remove this rotational hindrance when orientation information from the sensors indicates that board 104 has been moved to the level orientation.

The rider may move board 104 to the level orientation, as shown in FIG. 8, by shifting their weight to pivot board 104 about pitch axis A1. Movement of board 104 to the level orientation may initialize active balancing of vehicle 100 via control loop 620 (see FIG. 6). In some embodiments, circuitry of vehicle 100 may be configured to initialize (or proceed to) loop 620 after board 104 has been maintained in the level orientation (or a range of orientations near the level orientation) for a predetermined duration of time (e.g., 1 second), which may provide adequate delay for ensuring that the rider is in control of vehicle 100.

As indicated in FIG. 9, the rider may pivot board 104 about pitch axis A1 by angle 81 to move vehicle 100 "forward" (that is to the to the right in FIG. 9) via clockwise rotation provided by motor 144. The rider may increase the clockwise rotation of motor 144, and thus the forward speed of vehicle 100 by further pivoting board 104 in a clockwise direction, for example to produce pitch angle θ2.

As the rider increases the speed of vehicle 100 by pressing deck portion 116 further toward the ground (e.g., to pitch angle θ2), the power output of motor 144 may approach a maximum power output. At the maximum output of motor 144, pressing deck portion 116 further toward the ground may result in a front end of the board contacting the ground at a relatively high speed, which may result in an accident. To prevent a likelihood of such an accident, vehicle 100 may include a power margin indication feature configured to indicate to the rider a margin between a current power output of motor 144 and the maximum power output of motor 144. For example, when the current power output of motor 144 reaches a predetermined headroom threshold near the maximum power output (e.g., if motor 144 is being driven at a relatively high speed or rate and the rider pivots board 104 to pitch angle θ2), circuitry of vehicle 100 may be configured to send an increased pulse of power (e.g., in excess of the headroom threshold, but less than or equal to the maximum power output) to motor 144 to push back the rider and move the board 104 back toward (and/or to) the level orientation (or in some embodiments, even further back). In some embodiments, the power margin indicator may communicate a relationship between the current power output and the maximum power output by emitting an audio signal (e.g., from the buzzer) or a visual signal (e.g., from a tachometer). In some embodiments, the power margin indicator may be configured to similarly indicate a margin (or ratio) between the current power output and the maximum power output when vehicle 100 is propelled in reverse, as shown in FIG. 10.

While pivoting board 104 to have a pitch angle with respect to the level orientation, as shown in FIGS. 9 and 10, the rider may pivot board 104 about roll axis A2, as is shown in FIG. 11, to modulate power to the motor.

Figure 12:
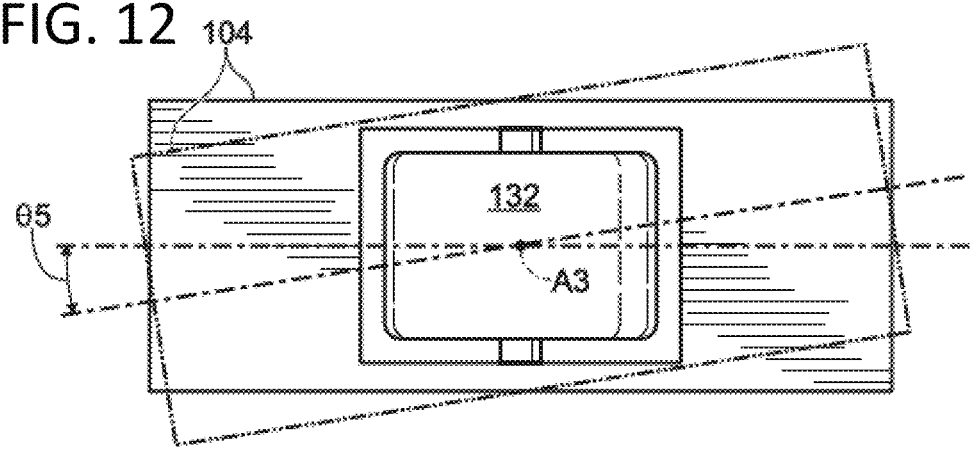
FIG. 12 is semi-schematic top view of the electric vehicle being moved to a sixth orientation to modulate the rotational rate of the hub motor.

Similarly, while pivoting board 104 to have a pitch angle with respect to the level orientation, the rider may pivot board 104 about yaw axis A3, as is shown in FIG. 12, to modulate power to the motor.

Additional and/or alternative methods of operation are reflected in Section E, below.

E. Illustrative Reverse-to-Dismount Methods

This section describes steps of several illustrative methods for stopping the vehicle so the rider can easily dismount. In general, the system detects when a rider has caused the board to roll backward and adjusts one or more control parameters (e.g., proportionally) to affect the self-balancing function. This effect may continue (e.g., in an increasing fashion) until a threshold is met and balancing is disengaged entirely, thereby facilitating a straightforward and intuitive dismounting process for the rider. This may result in the rider being able to dismount simply by leaning backward and causing the board to come to a stop, which is advantageous particularly for people who are learning to ride.

As further context for the following methods, additional aspects of the PID loop described above will now be explained. First, the PID control system may achieve self-balancing at least in part by attempting to maintain the board at a given reference angle, also referred to as a balance angle. In a preferred example, this is the zero degree pitch angle (i.e., level) referred to in Section D above. In some examples, the reference angle is adjustable, e.g., directly adjustable and/or using an adjustable offset parameter, such that the control system may attempt to maintain an angle different than zero degrees. The offset balance angle can be changed manually (e.g., based on user preference) and/or automatically (e.g., see below).

Second, the PID controls may include a tuning parameter known as proportional gain. This proportional gain parameter causes the loop to produce an output that is proportional to the then-current error value (e.g., the difference between actual board angle and the reference or balance angle). Accordingly, the response of the system can be adjusted by changing the proportional gain constant. For a given change in the error, a higher proportional gain constant results in a larger change in the output and a smaller proportional gain constant results in smaller change in the output. In some examples, the proportional gain parameter contributes to a majority of the change in output, as compared with other PID loop parameters.

Accordingly, a control system may include a hub motor and a motor controller, as described above. The motor controller is configured to receive orientation information indicating an orientation of a tiltable portion of the vehicle and to cause the hub motor to propel the vehicle based on the orientation information. In this section, various schemes are described wherein the motor controller includes processing logic configured to (a) receive direction information indicating a direction in which the hub motor is being commanded to propel the vehicle; (b) in response to the direction information indicating a first direction (i.e., backward), hinder a responsiveness of the motor controller to the orientation information by automatically adjusting a first parameter of the motor controller; and (c) in response to the first parameter reaching a first threshold, disengaging the hub motor.

Various embodiments of this general control scheme will now be described, as steps of illustrative methods 1300, 1400, 1500, 1600, and 1700 outlined below (see FIGS. 13-17). Aspects of the vehicles and controls described above may be utilized in the method steps of these methods. Where appropriate, reference may be made to components and systems that may be used in carrying out each step. These references are for illustration, and are not intended to limit the possible ways of carrying out any particular step of the method.

Figure 13:
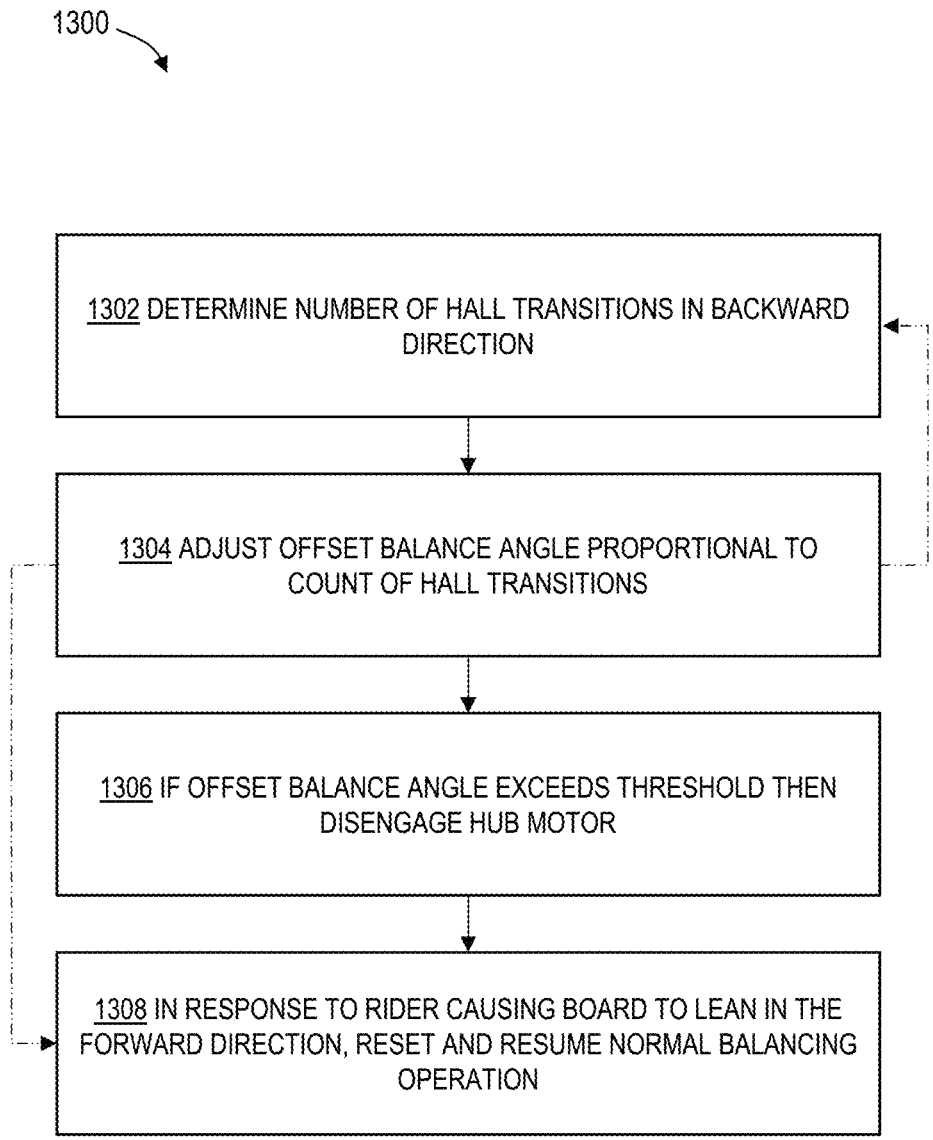
FIG. 13 is a flowchart depicting steps of a first illustrative method for controlling a one-wheeled vehicle during a rider dismount phase of operation.

FIG. 13 is a flowchart illustrating steps performed in method 1300, and may not recite the complete process or all steps of the method. Although various steps of method 1300 are described below and depicted in FIG. 13, the steps need not necessarily all be performed, and in some cases may be performed simultaneously or in a different order than the order shown.

At step 1302, the control system of the vehicle determines how far the wheel has turned in a reverse or backward direction. For example, the system may count the number of transitions experienced by the Hall sensor(s) (e.g., Hall sensors 418), also referred to as Hall transitions, as the wheel turns in the backward direction. Any suitable method configured to determine motor and/or wheel rotation may be utilized in this step. For example, wheel and/or motor rotation may be determined by an estimator or encoder.

The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control). By determining the number of Hall transitions in the backward direction, the system has an indication of how far the motor/wheel has moved (e.g., in degrees).

Step 1304 of method 1300 includes adjusting (i.e., reducing) a balance angle offset parameter (a.k.a. offset balance angle) proportional (or otherwise corresponding) to the number of Hall transitions determined in step 1302 (or other indicator of amount of backward rotation). This offset is in the backward direction. In other words, after the adjustment, the system may attempt to maintain balance at an angle where the "tail" end of the board is lower than the front end.

Step 1306 of method 1300 includes comparing the balance angle offset parameter against a threshold (e.g., an offset threshold). If the offset parameter exceeds the threshold, then the motor is directed to disengage or turn off. In some examples, the rotor may be locked, e.g., by applying a non-commutating current. Note that the PID loop may result in multiple passes, each of which includes repeating steps 1302 and 1304 and comparing the resulting offset to the threshold. When the motor is disengaged, the rider is free to step off the board without concern for unexpected motion.

Step 1308 of method 1300 includes, in response to the rider causing the board to lean in the forward direction, resetting the offset balance angle and resuming normal self-balancing operations. In some examples, the forward lean angle of step 1308 will reset the offset balance angle at any point, including before obtaining the threshold and subsequent motor shutdown. In some examples, causing the board to lean in the forward direction may include bringing the board to level (i.e., zero degrees pitch).

Figure 14:
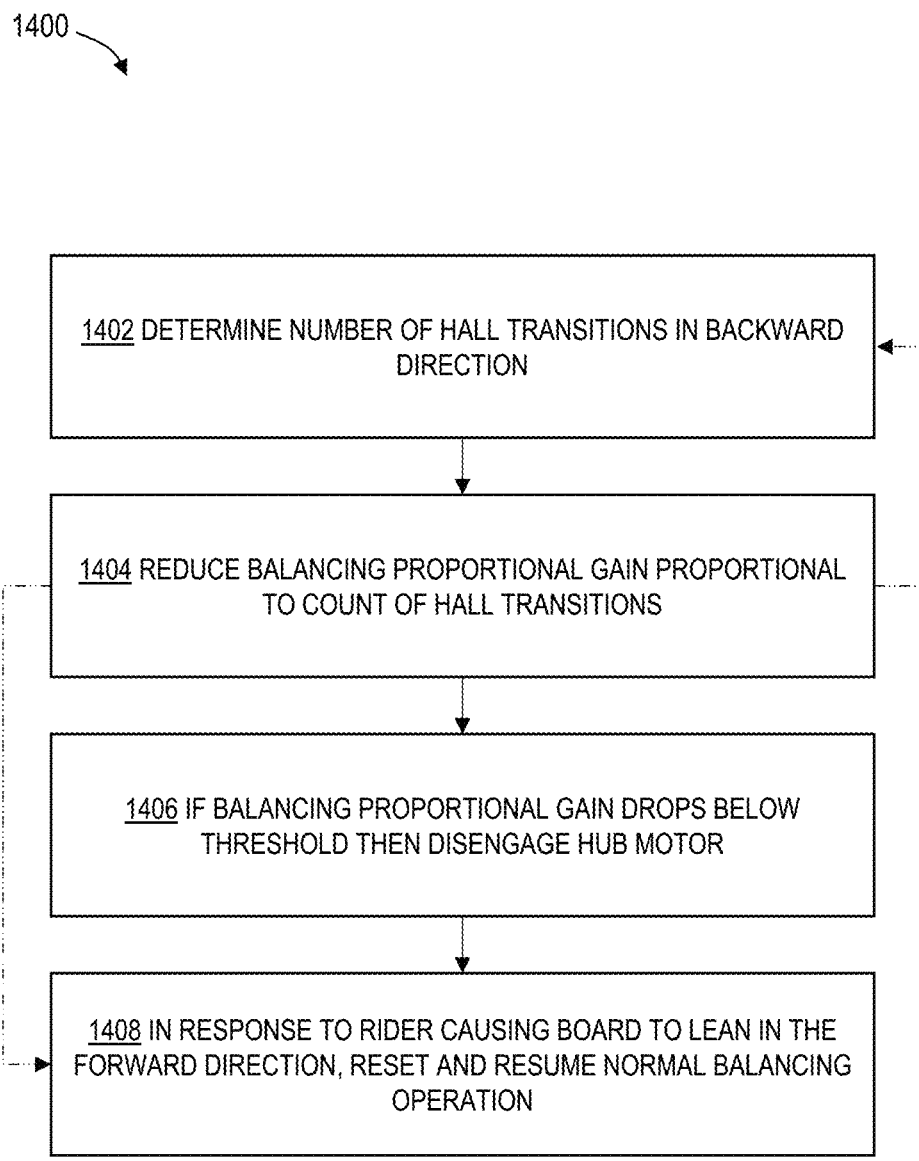
FIG. 14 is a flowchart depicting steps of a second illustrative method for controlling a one-wheeled vehicle during a rider dismount phase of operation.

FIG. 14 is a flowchart illustrating steps performed in method 1400, and may not recite the complete process or all steps of the method. Although various steps of method 1400 are described below and depicted in FIG. 14, the steps need not necessarily all be performed, and in some cases may be performed simultaneously or in a different order than the order shown.

At step 1402, the control system of the vehicle determines how far the wheel has turned in a reverse or backward direction, similar to step 1302. For example, the system may count the number of transitions experienced by the Hall sensor(s) (e.g., Hall sensors 418), also referred to as Hall transitions, as the wheel turns in the backward direction. Any suitable method configured to determine motor and/or wheel rotation may be utilized in this step. For example, wheel and/or motor rotation may be determined by an estimator or encoder.

The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control). By determining the number of Hall transitions in the backward direction, the system has an indication of how far the motor/wheel has moved (e.g., in degrees).

Step 1404 of method 1400 includes adjusting (i.e., reducing) a proportional gain parameter related to balancing (a.k.a. a balancing proportional gain). As when adjusting the offset in step 1304, this adjustment is proportional (or otherwise corresponds) to the number of Hall transitions determined in step 1402 (or other indicator of amount of backward rotation). As described above, reducing the proportional gain constant will result in a less responsive control system. Continuing to do so will result in a progressively less responsive system. In other words, the rider may experience the board response feeling progressively weaker until the tail of the board touches the ground.

Step 1406 of method 1400 includes comparing the balancing proportional gain parameter against another threshold (e.g., a gain threshold). If the proportional gain is less than the threshold, then the motor is directed to disengage or turn off. In some examples, the rotor may be locked, e.g., by applying a non-commutating current. Note that the PID loop may result in multiple passes, each of which includes repeating steps 1402 and 1404 and comparing the resulting gain to the threshold. When the motor is disengaged, the rider is free to step off the board without concern for unexpected motion.

Step 1408 of method 1400 includes, in response to the rider causing the board to lean in the forward direction, resetting the proportional gain and resuming normal self-balancing operations. In some examples, the forward lean angle of step 1408 will reset the proportional gain at any point, including before obtaining the threshold and subsequent motor shutdown. In some examples, causing the board to lean in the forward direction may include bringing the board to level (i.e., zero degrees pitch).

Figure 15:
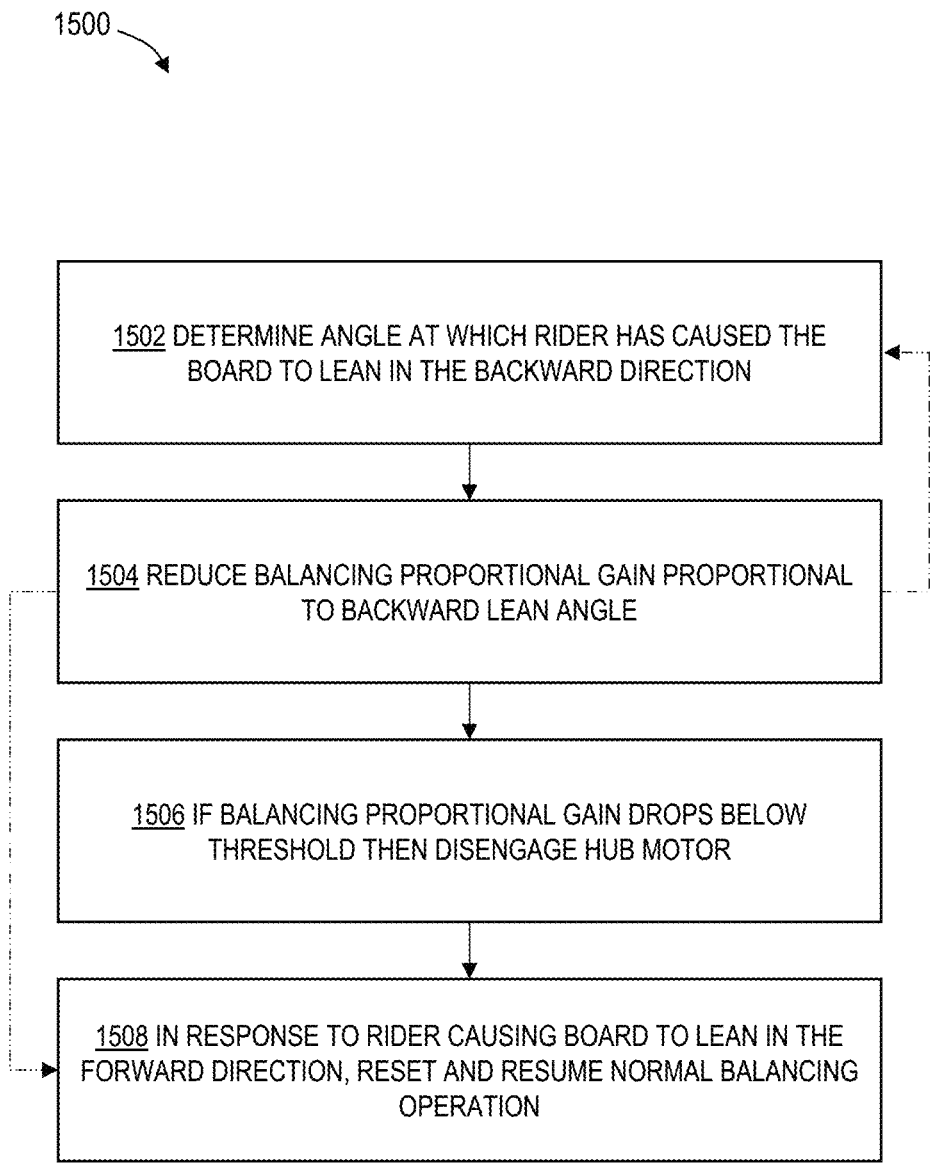
FIG. 15 is a flowchart depicting steps of a third illustrative method for controlling a one-wheeled vehicle during a rider dismount phase of operation.

FIG. 15 is a flowchart illustrating steps performed in method 1500, and may not recite the complete process or all steps of the method. Although various steps of method 1500 are described below and depicted in FIG. 15, the steps need not necessarily all be performed, and in some cases may be performed simultaneously or in a different order than the order shown.

At step 1502, the control system of the vehicle determines the board angle and recognizes that the board has been tilted in the backward or rearward direction (i.e., tail-down). The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control).

Step 1504 of method 1500 includes adjusting (i.e., reducing) a proportional gain parameter related to balancing (a.k.a. a balancing proportional gain). Similar to when adjusting the offset in steps 1304 and 1404, this adjustment is proportional (or otherwise corresponds) to the board angle determined in step 1502. As described above, reducing the proportional gain constant will result in a less responsive control system. Continuing to do so will result in a progressively less responsive system. In this example, the rider may experience board control becoming weaker in the reverse direction, until the rider is able to force the tail down.

Step 1506 of method 1500 includes comparing the balancing proportional gain parameter against a threshold (e.g., a gain threshold). If the proportional gain is less than the threshold, then the motor is directed to disengage or turn off. In some examples, the rotor may be locked, e.g., by applying a non-commutating current. Note that the PID loop may result in multiple passes, each of which includes repeating steps 1502 and 1504 and comparing the resulting gain to the threshold. When the motor is disengaged, the rider is free to step off the board without concern for unexpected motion.

Step 1508 of method 1500 includes, in response to the rider causing the board to lean in the forward direction, resetting the proportional gain and resuming normal self-balancing operations. In some examples, the forward lean angle of step 1508 will reset the proportional gain at any point, including before obtaining the threshold and subsequent motor shutdown. In some examples, causing the board to lean in the forward direction may include bringing the board to level (i.e., zero degrees pitch).

Figure 16:
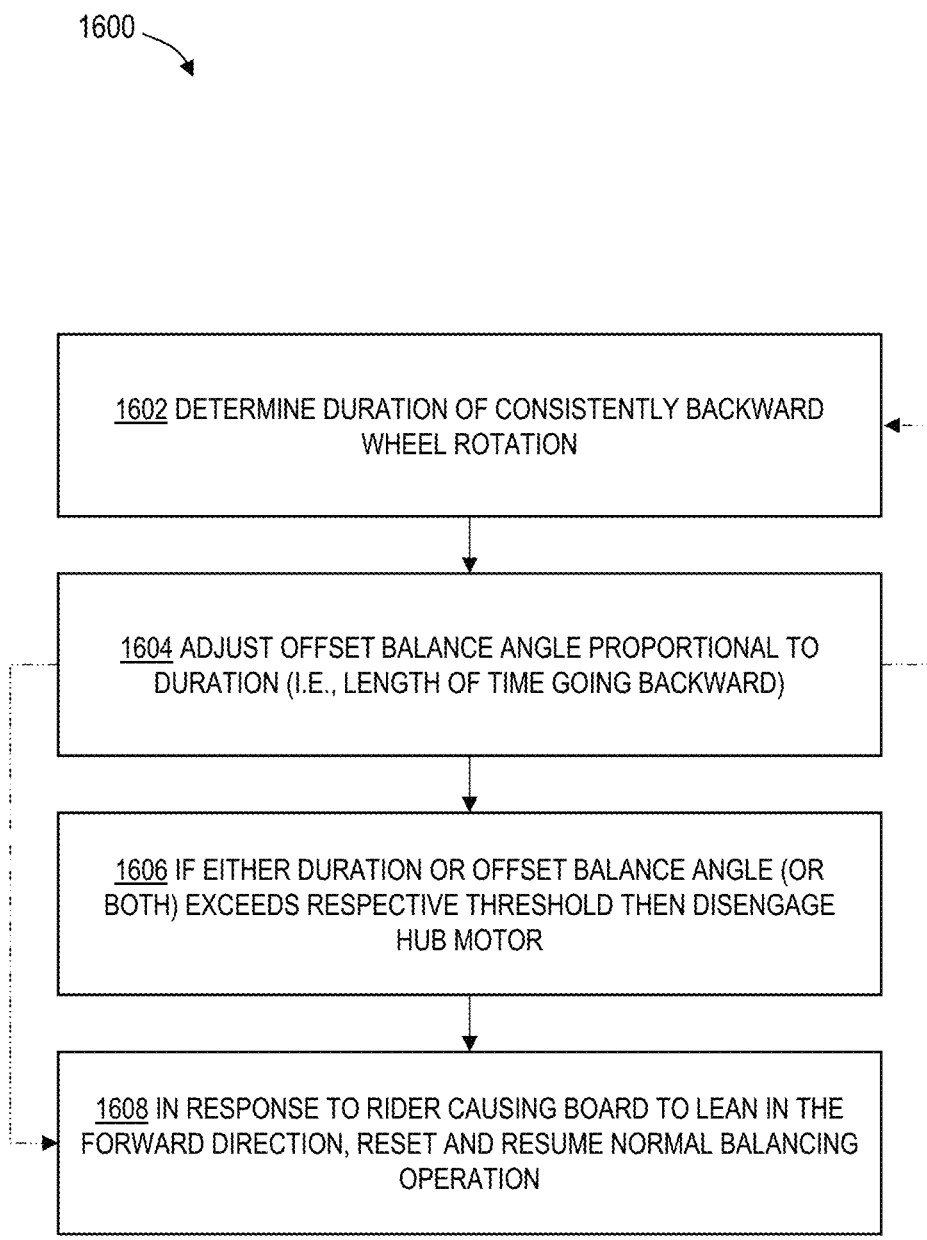
FIG. 16 is a flowchart depicting steps of a fourth illustrative method for controlling a one-wheeled vehicle during a rider dismount phase of operation.

FIG. 16 is a flowchart illustrating steps performed in method 1600, and may not recite the complete process or all steps of the method. Although various steps of method 1600 are described below and depicted in FIG. 16, the steps need not necessarily all be performed, and in some cases may be performed simultaneously or in a different order than the order shown.

At step 1602, the control system of the vehicle determines how long (e.g., in milliseconds) the rider has been rolling the board backward by recognizing that the Hall transitions are in the backward direction (or using any other suitable method) and measuring how long that continues. The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control).

Step 1604 of method 1600 includes adjusting (i.e., reducing) a balance angle offset parameter (a.k.a. offset balance angle) proportional (or otherwise corresponding) to the length of time (i.e., duration) going in the backward direction, determined in step 1602. This offset is in the backward direction. In other words, after the adjustment, the system may attempt to maintain balance at an angle where the "tail" end of the board is lower than the front end.

Step 1606 of method 1600 includes comparing the balance angle offset parameter against a first threshold (e.g., an offset threshold) and comparing the duration traveling in reverse to a second threshold (e.g., a duration threshold). If either or both of the offset parameter and the duration exceeds its respective threshold, then the motor is directed to disengage or turn off. In some examples, the rotor may be locked, e.g., by applying a non-commutating current. Note that the PID loop may result in multiple passes, each of which includes repeating steps 1602 and 1604 and comparing the resulting duration and offset to the thresholds. When the motor is disengaged, the rider is free to step off the board without concern for unexpected motion.

Step 1608 of method 1600 includes, in response to the rider causing the board to lean in the forward direction, resetting the offset balance angle and resuming normal self-balancing operations. In some examples, the forward lean angle of step 1608 will reset the offset balance angle at any point, including before obtaining the threshold and subsequent motor shutdown. In some examples, causing the board to lean in the forward direction may include bringing the board to level (i.e., zero degrees pitch).

Figure 17:
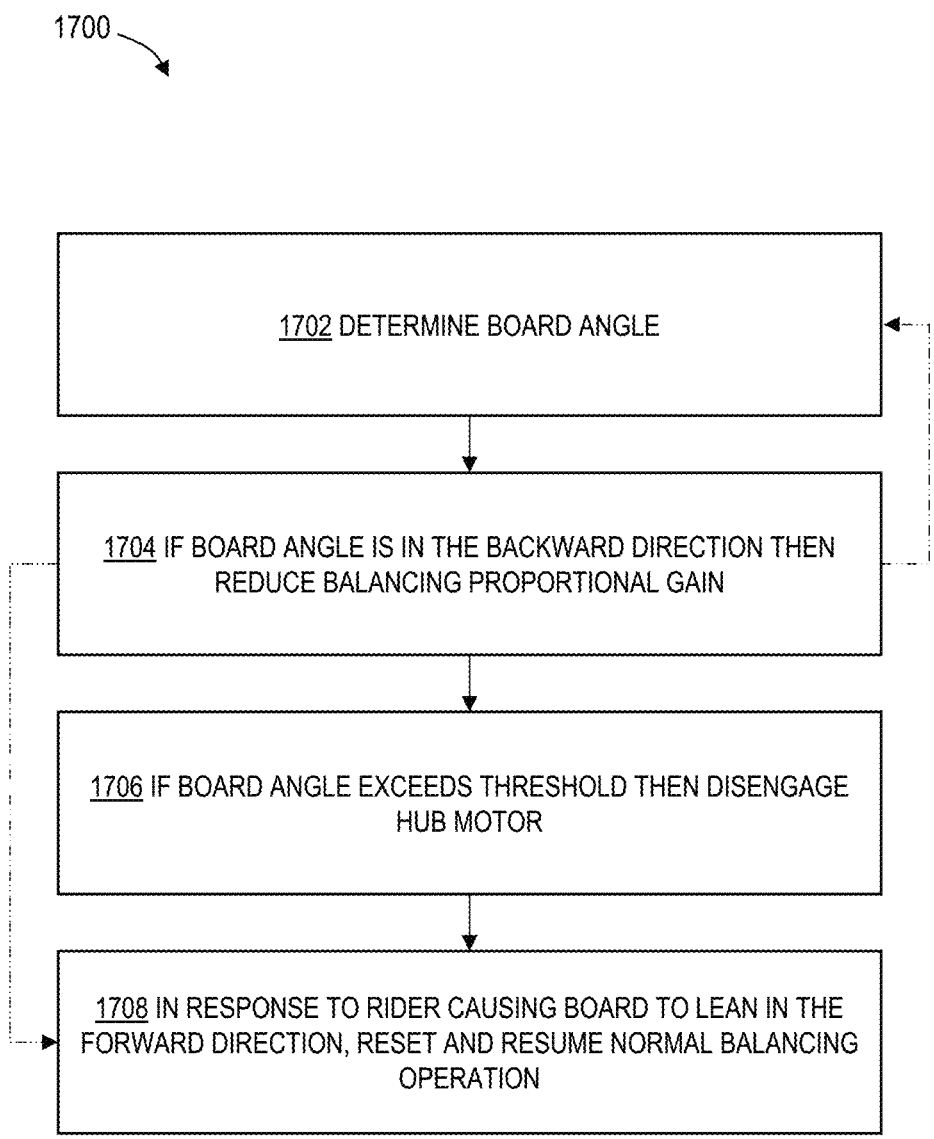
FIG. 17 is a flowchart depicting steps of a fifth illustrative method for controlling a one-wheeled vehicle during a rider dismount phase of operation.

FIG. 17 is a flowchart illustrating steps performed in method 1700, and may not recite the complete process or all steps of the method. Although various steps of method 1700 are described below and depicted in FIG. 17, the steps need not necessarily all be performed, and in some cases may be performed simultaneously or in a different order than the order shown.

At step 1702, the control system of the vehicle determines the board angle and determines whether the board angle corresponds to the backward or rearward direction (i.e., tail-down). The designation of backward and forward may be predetermined, may be set manually, and/or may be determined dynamically based on previous operation of the vehicle (e.g., during the present riding episode). In some examples, this designation may be disabled, such that the present method is also disabled (e.g., by an expert rider wishing to go in both directions with equal control).

Step 1704 of method 1700 includes adjusting (i.e., reducing) a proportional gain parameter related to balancing (a.k.a. a balancing proportional gain). This adjustment is proportional (or otherwise corresponds) to the board angle determined in step 1702. As described above, reducing the proportional gain constant will result in a less responsive control system. Continuing to do so will result in a progressively less responsive system.

Step 1706 of method 1700 includes comparing the board angle against a threshold (e.g., a tilt threshold). If the board angle exceeds the threshold, then the motor is directed to disengage or turn off. In some examples, the rotor may be locked, e.g., by applying a non-commutating current. Note that the PID loop may result in multiple passes, each of which includes repeating steps 1702 and 1704 and comparing the board angle to the threshold. When the motor is disengaged, the rider is free to step off the board without concern for unexpected motion.

Step 1708 of method 1700 includes, in response to the rider causing the board to lean in the forward direction, resetting the proportional gain and resuming normal self-balancing operations. In some examples, the forward lean angle of step 1708 will reset the proportional gain at any point, including before obtaining the threshold and subsequent motor shutdown. In some examples, causing the board to lean in the forward direction may include bringing the board to level (i.e., zero degrees pitch).

F. Illustrative Combinations and Additional Examples

This section describes additional aspects and features of control systems for one-wheeled vehicles, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A self-balancing electric vehicle comprising:
one or more wheels having a common axis of rotation;
a board having a first end and a second end, wherein the board is tiltable about the axis of the one or more wheels;
an electric hub motor configured to drive the one or more wheels;
a motor controller configured to receive orientation information indicating an orientation of the board and to cause the hub motor to propel the board based on the orientation information, wherein the motor controller includes processing logic configured to:
receive direction information indicating a direction in which the hub motor is being commanded to propel the board;
in response to the direction information indicating a first direction, hinder a responsiveness of the motor controller to the orientation information by automatically adjusting a first parameter of the motor controller; and
in response to the first parameter reaching a first threshold, disengaging the hub motor.

A1. The vehicle of paragraph A0, wherein the direction information has a varying magnitude, and the first parameter is automatically adjusted proportionally with respect to the magnitude of the direction information.

A2. The vehicle of paragraph A0 or A1, wherein the vehicle has exactly one wheel, the board includes first and second deck portions each configured to receive a left or right foot of a rider oriented generally perpendicular to a direction of travel of the board, and the exactly one wheel is disposed between and extends above the first and second deck portions.

A3. The vehicle of any one of paragraphs A0 through A2, wherein a proportional-integral-derivative (PID) loop of the motor controller is configured to maintain a selected balance angle of the board, and the first parameter comprises a balance angle offset, such that adjusting the balance angle offset effectively causes the motor controller to attempt to maintain a different balance angle.

A4. The vehicle of any one of paragraphs A0 through A3, wherein a proportional-integral-derivative (PID) loop of the motor controller is configured to produce an output that is proportional to an error between an actual board angle and a reference angle, and the first parameter comprises a proportional gain constant, such that adjusting the proportional gain constant changes the responsiveness of the PID loop to the error.

A5. The vehicle of any one of paragraphs A0 through A4, wherein the processing logic is further configured to:
determine a duration spent moving in the first direction; and
in response to the duration reaching a duration threshold, disengaging the hub motor.

A6. The vehicle of any one of paragraphs A0 through A5, wherein the direction information comprises wheel rotation information.

A7. The vehicle of paragraph A6, wherein the one or more wheels comprise at least one Hall sensor, and the wheel rotation information comprises a count of Hall transitions received from the at least one Hall sensor.

A8. The vehicle of paragraph A7, wherein the first parameter is adjusted proportionally with respect to the count of Hall transitions.

A9. The vehicle of any one of paragraphs A0 through A8, wherein the direction information comprises a directional orientation of the board relative to a level orientation.

A10. The vehicle of any one of paragraphs A0 through A9, wherein the first direction is defined as backward and is user-selectable.

A11. The vehicle of any one of paragraphs A0 through A10, wherein the processing logic is further configured to:
in response to the direction information indicating a second direction, reset the first parameter and resume balancing operation of the motor controller.

A12. The vehicle of paragraph A11, wherein the hub motor is maintained in a disengaged state until board orientation is level.

B0. A control system for an electric vehicle, the control system comprising:
a hub motor configured to be coupled to a wheel of a vehicle;
a motor controller configured to receive orientation information indicating an orientation of a tiltable portion of the vehicle and to cause the hub motor to propel the vehicle based on the orientation information, wherein the motor controller includes processing logic configured to:
receive direction information indicating a direction in which the hub motor is being commanded to propel the vehicle;
in response to the direction information indicating a first direction, hinder a responsiveness of the motor controller to the orientation information by automatically adjusting a first parameter of the motor controller; and
in response to the first parameter reaching a first threshold, disengaging the hub motor.

B1. The control system of B0, wherein the direction information has a varying magnitude, and the first parameter is automatically adjusted proportionally with respect to the magnitude of the direction information.

B2. The vehicle of paragraph B0 or B1, wherein a proportional-integral-derivative (PID) loop of the motor controller is configured to maintain a selected balance angle of the tiltable portion of the vehicle, and the first parameter comprises a balance angle offset, such that adjusting the balance angle offset effectively causes the motor controller to attempt to maintain a different balance angle.

B3. The vehicle of any one of paragraphs B0 through B2, wherein a proportional-integral-derivative (PID) loop of the motor controller is configured to produce an output that is proportional to an error between an actual angle of the tiltable portion and a reference angle, and the first parameter comprises a proportional gain constant, such that adjusting the proportional gain constant changes the responsiveness of the PID loop to the error.

B4. The vehicle of any one of paragraphs B0 through B3, wherein the processing logic is further configured to:
determine a duration spent moving in the first direction; and
in response to the duration reaching a duration threshold, disengaging the hub motor.

B5. The vehicle of any one of paragraphs B0 through B4, wherein the direction information comprises wheel rotation information.

B6. The vehicle of paragraph B5, wherein the wheel of the vehicle comprises at least one Hall sensor, and the wheel rotation information comprises a count of Hall transitions received from the at least one Hall sensor.

B7. The vehicle of paragraph B6, wherein the first parameter is adjusted proportionally with respect to the count of Hall transitions.

B8. The vehicle of any one of paragraphs B0 through B7, wherein the direction information comprises a directional orientation of the tiltable portion relative to a level orientation.

B9. The vehicle of claim any one of paragraphs B1 through B8, wherein the first direction is defined as backward and is user-selectable.

B10. The vehicle of any one of paragraphs B0 through B9, wherein the processing logic is further configured to:
in response to the direction information indicating a second direction, reset the first parameter and resume balancing operation of the motor controller.

B11. The vehicle of paragraph B10, wherein the hub motor is maintained in a disengaged state until board orientation is level.

Advantages, Features, and Benefits

The different embodiments and examples of the reverse-to-dismount control system described herein provide several advantages over known solutions. For example, illustrative embodiments and examples described herein provide an intuitive method for the rider to dismount, enhancing the riding experience as well as safety.

Additionally, and among other benefits, illustrative embodiments and examples described herein respond in a proportional manner, such that the rider can control the dismount process more predictably.

Additionally, and among other benefits, illustrative embodiments and examples described herein allow disengagement of the hub motor using aspects of the normal-operation control method of tilting the board, such that additional buttons or user controls are unnecessary.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for operating a self-balancing electric vehicle, the method comprising:
   receiving, at a motor controller of a self-balancing electric vehicle, orientation information indicating an orientation of a frame of the vehicle, wherein the vehicle comprises exactly one wheel and an electric hub motor configured to drive the wheel, and the frame is tiltable about a pitch axis oriented perpendicular to a direction of vehicle travel;
   automatically balancing the vehicle using the motor controller by causing the hub motor to propel the vehicle based on the orientation information;
   responding to an indication that the vehicle is travelling in a reverse direction by refraining from automatic balancing.

2. The method of claim 1, wherein refraining from automatic balancing comprises locking a rotor of the hub motor by applying a non-commutating current.

3. The method of claim 1, wherein refraining from automatic balancing comprises disabling the hub motor.

4. The method of claim 1, wherein the indication that the vehicle is travelling in the reverse direction includes vehicle direction information.

5. The method of claim 4, wherein the vehicle direction information has a variable magnitude, and wherein a responsiveness of the motor controller is automatically adjusted proportionally with respect to the magnitude of the vehicle direction information.

6. The method of claim 1, wherein automatically balancing includes using a proportional-integral-derivative (PID) loop of the motor controller configured to maintain a selected balance angle of the frame.

7. The method of claim 1, wherein responding to the indication that the vehicle is travelling in the reverse direction comprises:
   determining a duration spent travelling in reverse; and
   refraining from automatic balancing in response to the duration reaching a duration threshold.

8. The method of claim 1, further comprising:
   refraining from automatic balancing until the frame has a level orientation.

* * * * *